(12) United States Patent
Chang et al.

(10) Patent No.: US 8,175,004 B2
(45) Date of Patent: May 8, 2012

(54) APPARATUS AND METHOD FOR GATHERING AND REPORTING INTERFERENCE SIGNAL INFORMATION BETWEEN RELAY STATIONS IN MULTI-HOP RELAY BROADBAND WIRELESS ACCESS COMMUNICATION SYSTEM

(75) Inventors: Young-Bin Chang, Anyang-si (KR); Chang-Yoon Oh, Yongin-si (KR); Hyun-Jeong Kang, Seoul (KR); Taori Rakesh, Suwon-si (KR); Jae-Weon Cho, Suwon-si (KR); Hyoung-Kyu Lim, Suwon-si (KR); Sung-Jin Lee, Seoul (KR); Jung-Je Son, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1161 days.

(21) Appl. No.: 11/965,523

(22) Filed: Dec. 27, 2007

(65) Prior Publication Data

US 2008/0159217 A1    Jul. 3, 2008

(30) Foreign Application Priority Data

Dec. 27, 2006   (KR) .................. 10-2006-0135566
Dec. 29, 2006   (KR) .................. 10-2006-0137681
Jan. 9, 2007    (KR) .................. 10-2007-0002619
Jan. 19, 2007   (KR) .................. 10-2007-0006222

(51) Int. Cl.
*H04W 28/16* (2009.01)
*H04W 28/18* (2009.01)
*H04W 76/00* (2009.01)

(52) U.S. Cl. ............ 370/254; 370/315; 370/329; 455/9; 455/434; 455/452.2

(58) Field of Classification Search .................. 370/236, 370/254, 255, 279, 315, 328–330, 338; 455/9, 455/11.1, 236, 254, 255, 279, 315, 328–330, 455/338, 422.1, 434, 440, 450, 451, 451.2, 455/453
See application file for complete search history.

(56) References Cited

U.S. PATENT DOCUMENTS 5,428,603 A   6/1995  Kivett
(Continued)

FOREIGN PATENT DOCUMENTS

EP   0 817 521   1/1998
(Continued)

OTHER PUBLICATIONS

Changyoon Oh et al., IEEE 802.16j-06_256, "Proposed Frame Structure and Relay Region Indicator", Nov. 14, 2006.

(Continued)

*Primary Examiner* — Chi Pham
*Assistant Examiner* — Ahmed Elallam
(74) *Attorney, Agent, or Firm* — The Farrell Law Firm, P.C.

(57) ABSTRACT

An apparatus and method for gathering and reporting interference signal information between Relay Stations (RSs) in a multi-hop relay Broadband Wireless Access (BWA) communication system are provided. The method includes receiving, from the RS, scanning information of neighboring Base Stations (BSs) and neighboring RSs, computing the resource allocation to be used by the RS by using the received scanning information, and transmitting information on the computed resource allocation to the RS. Accordingly, there is an advantage in that wireless resources can be reused to the maximum extent, and data transmission efficiency can be maximized.

16 Claims, 22 Drawing Sheets

U.S. PATENT DOCUMENTS

| | | | |
|---|---|---|---|
| 6,694,141 B1 | 2/2004 | Pulkkinen et al. | |
| 7,668,504 B2 * | 2/2010 | Kang et al. | 455/11.1 |
| 7,720,020 B2 * | 5/2010 | Larsson | 370/315 |
| 7,822,382 B2 * | 10/2010 | Kang et al. | 455/11.1 |
| 7,853,203 B2 * | 12/2010 | Kang et al. | 455/11.1 |
| 2006/0285505 A1 | 12/2006 | Cho et al. | |
| 2007/0105558 A1 * | 5/2007 | Suh et al. | 455/436 |
| 2007/0123292 A1 * | 5/2007 | Kang et al. | 455/525 |
| 2007/0201392 A1 * | 8/2007 | Ramachandran | 370/315 |
| 2007/0249347 A1 * | 10/2007 | Saifullah et al. | 455/436 |
| 2007/0264933 A1 * | 11/2007 | Kang et al. | 455/13.1 |
| 2008/0031197 A1 * | 2/2008 | Wang et al. | 370/331 |
| 2008/0084856 A1 * | 4/2008 | Ramachandran | 370/342 |
| 2008/0107075 A1 * | 5/2008 | Ramachandran et al. | 370/331 |
| 2008/0107091 A1 * | 5/2008 | Ramachandran | 370/338 |
| 2008/0165727 A1 * | 7/2008 | Xiaoben et al. | 370/329 |
| 2009/0303918 A1 * | 12/2009 | Ma et al. | 370/315 |
| 2010/0296475 A1 * | 11/2010 | Visotsky et al. | 370/329 |

FOREIGN PATENT DOCUMENTS

| | | |
|---|---|---|
| EP | 1 081 896 | 3/2001 |
| EP | 1 662 826 | 5/2006 |
| EP | 1 758 414 | 2/2007 |
| KR | 1020060012210 | 2/2006 |
| KR | 1020060132422 | 12/2006 |
| WO | WO 01/62026 | 8/2001 |
| WO | WO 2005/124249 | 12/2005 |

OTHER PUBLICATIONS

Almgren M et al: "Slow Adaptive Channel Allocation for Automatic Frequency Planning", International Conference on Universal Personal Communications, XP002055382, pp. 260-264, Sep. 29, 1996.

* cited by examiner

APPARATUS AND METHOD FOR GATHERING AND REPORTING INTERFERENCE SIGNAL INFORMATION BETWEEN RELAY STATIONS IN MULTI-HOP RELAY BROADBAND WIRELESS ACCESS COMMUNICATION SYSTEM

PRIORITY

This application claims priority under 35 U.S.C. §119(a) to Korean patent applications filed in the Korean Intellectual Property Office on Dec. 27, 2006 and assigned Serial No. 2006-135566, on Dec. 29, 2006 and assigned Serial No. 2006-137681, on Jan. 9, 2007 and assigned Serial No. 2007-2619, and on Jan. 19, 2007 and assigned Serial No. 2007-6222, respectively, the contents of each of which are incorporated herein by reference.

BACKGROUND OF THE INVENTION

1. Field of the Invention

The present invention relates generally to a multi-hop relay Broadband Wireless Access (BWA) communication system, and more particularly, to an apparatus and method in which a Mobile Station (MS) or a Relay Station (RS) measures signals from neighboring Base Stations (BSs) and neighboring RSs, and when the RS transmits the measurement result to a BS as interference signal information, the BS computes a resource allocation to be used by the RS by using the interference signal information.

2. Description of the Related Art

FIG. 1 illustrates a conventional scanning process for a handoff. Referring to FIG. 1, while communication takes place between a first Mobile Station (MS) 101 and a first Base Station (BS) 103-1, the first MS 101 may be allocated with a scanning period by the first BS 103-1, or may request the first BS 103-1 to allocate a specific scanning period to the first MS 101. During this period, the first MS 101 terminates communication with the first BS 103-1, measures signal strength values of a second BS 103-2 and a third BS 103-3, and reports to the first BS 103-1 the signal strength values of the second BS 103-2 and the third BS 103-3. The signal strength values may be either Received Signal Strength Indicator (RSSI) values or Carrier to Interference and Noise Ratio (CINR) values. In this case, the first BS 103-1 determines whether to perform a handoff of the first MS 101 by using the reported values.

FIG. 2 illustrates a physical frame structure when communication takes place in a multi-hop environment in a conventional Institute of Electrical and Electronics Engineers (IEEE) 802.16 Orthogonal Frequency Division Multiplexing (OFDM) system.

Referring to FIG. 2, a DownLink (DL) frame is divided into an access zone 201 and a relay zone 203. The access zone 201 is used when a BS transmits data to MSs in the multi-hop environment or when a Relay Station (RS) transmits data to the MSs. The relay zone 203 is used when the BS transmits data to the RS or when the RS transmits data to a downstream RS. Likewise, an UpLink (UL) frame is divided into an access zone 205 and a relay zone 207. In contrast with the DL frame, the access zone 205 is used when the MSs transmit data to the BS or the RS, and the relay zone 207 is used when the RS transmits data to the BS or an upstream RS.

The access and relay zones can spatially reuse resources according to signal interference between a BS and an RS. For example, when there is sufficient spatial separation between the BS and the RS to negate mutual signal interference, there is no interference between the BS and the RS when communication is made with MSs in the DL and UL access zones. However, when there is insufficient special separation between the BS and the RS, signal interference can be avoided only when the BS and the RS use different resources of the access zones in a time or frequency domain.

SUMMARY OF THE INVENTION

An aspect of the present invention is to address at least the above-mentioned problems and/or disadvantages and to provide at least the advantages described below. Accordingly, an aspect of the present invention is to provide an apparatus and method for gathering and reporting interference signal information between RSs in a multi-hop relay BWA communication system.

An aspect of the present invention is to provide an apparatus and method for maximizing reuse of wireless resources by measuring an interference signal and for maximizing data transmission efficiency in a multi-hop relay BWA communication system.

An aspect of the present invention is to provide an apparatus and method in which an MS or an RS measures signals from neighboring BSs and neighboring RSs, and when the RS transmits the measurement result to a BS as interference signal information, the BS computes a resource allocation to be used by the RS by using the interference signal information.

According to the present invention, a method of computing a resource allocation of an RS in an entity having a right to control the RS in a BWA communication system is provided. The method includes receiving, from the RS, scanning information of neighboring BSs and neighboring RSs, computing the resource allocation to be used by the RS by using the received scanning information, and transmitting information on the computed resource allocation to the RS.

According to the present invention, a method of computing a resource allocation of an RS in an entity having a right to control the RS in a BWA communication system is provided. The method includes receiving scanning information of neighboring BSs and neighboring RSs from one or more MSs connected directly to the entity or from one or more MSs connected to the entity via the RS, computing the resource allocation to be used by the RS by using the received scanning information, and transmitting information on the computed resource allocation to the RS.

According to the present invention, a method of computing a resource allocation of an RS in an entity having a right to control the RS in a BWA communication system is provided. The method includes receiving a position coordinate value from the RS, computing the resource allocation to be used by the RS by using the received position coordinate value, and transmitting information on the computed resource allocation to the RS.

According to the present invention, an apparatus for computing a resource allocation of an RS in a BWA communication system is provided. The apparatus includes the RS for scanning neighboring BSs and neighboring RSs and for transmitting scanning information to a BS, and the BS for computing the resource allocation to be used by the RS by using the scanning information and for transmitting information on the computed resource allocation to the RS.

According to the present invention, an apparatus for computing a resource allocation of an RS in a BWA communication system is provided. The apparatus includes a BS for receiving scanning information of neighboring BSs and neighboring RSs from one or more MSs directly connected or from one or more MSs connected via the RS and for computing the resource allocation to be used by the RS by using the received scanning information, and the RS for receiving information on the computed resource allocation from the BS.

According to the present invention, an apparatus for computing a resource allocation of an RS in a BWA communication system is provided. The apparatus includes the RS for computing a position coordinate value and for transmitting the computation result to a BS, and the BS for computing the resource allocation to be used by the RS by using the position coordinate value and for transmitting information on the computed resource allocation to the RS.

According to the present invention, a structure of a DL frame of a BS in a BWA communication system is provided. The structure includes a first period for transmitting a preamble for measuring an interference signal to an MS, a second period for transmitting a signal to the MS, a third period for transmitting a signal to an RS, and a fourth period for transmitting a signal for measuring the interference signal to the RS.

According to the present invention, a structure of a DL frame of an RS in a BWA communication system is provided. The structure includes a first period for transmitting a preamble for measuring an interference signal to an MS, a second period for transmitting a signal to the MS, a third period for receiving a signal from a BS, and a fourth period for measuring the interference signal by receiving a signal for measuring the interference signal from the BS.

According to the present invention, a frame structure of an RS in a BWA communication system is provided. The frame structure includes a first DL period for transmitting a preamble for measuring an interference signal to an MS, a second DL period for transmitting a signal to the MS, a third DL period for receiving a signal from a BS, and a fourth DL period for transmitting, by some RSs, a signal for measuring the interference signal to remaining RSs and for measuring, by the remaining RSs, the interference signal by receiving the signal for measuring the interference signal.

According to the present invention, a frame structure of an RS group including a plurality of RSs in association with an odd hop in a BWA communication system is provided. The frame structure includes a first DL period for transmitting a preamble for measuring an interference signal to an MS, a second DL period for transmitting a signal to the MS, a third DL period for receiving a signal from a BS or an RS group including a plurality of RSs in association with an even hop, a fourth DL period for measuring an interference signal by receiving a signal for measuring the interference signal from the BS or the RS group including the RSs in association with the even hop, a fifth DL period for transmitting a signal to the RS group including the RSs in association with the even hop, and a sixth DL period for transmitting the signal for measuring the interferences signal to the RS group including the RSs in association with the even hop.

According to the present invention, a DL frame structure of an RS group including a plurality of RSs in association with an even hop in a BWA communication system is provided. The structure includes a first period for transmitting a preamble for measuring an interference signal to an MS, a second period for transmitting a signal to the MS, a third period for transmitting a signal to the RS group including a plurality of RSs in association with an odd hop, a fourth period for transmitting a signal for measuring the interference signal to the RS group including the RSs in association with the odd hop, a fifth period for receiving a signal from the RS group including the RSs in association with the odd hop, and a sixth period for receiving the signal for measuring the interference signal from the RS group including the RSs in association with the odd hop and for measuring the interference signal.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail for the sake of clarity and conciseness.

Figure 3A:
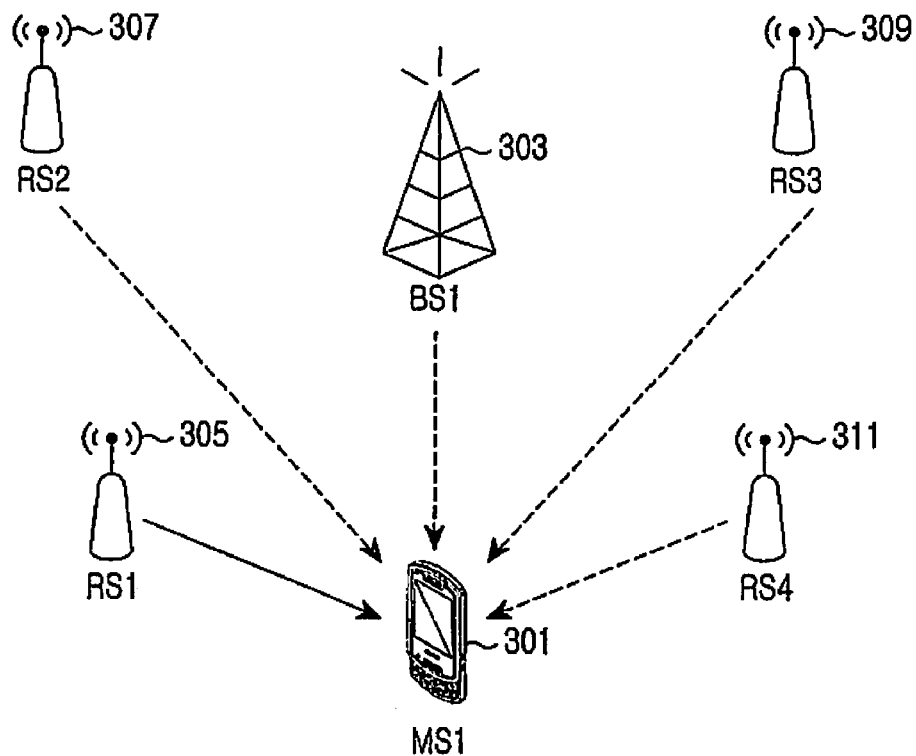
FIGS. 3A and 3B illustrate a signal interference model in a multi-hop relay BWA communication system according to the present invention.
Figure 3B:
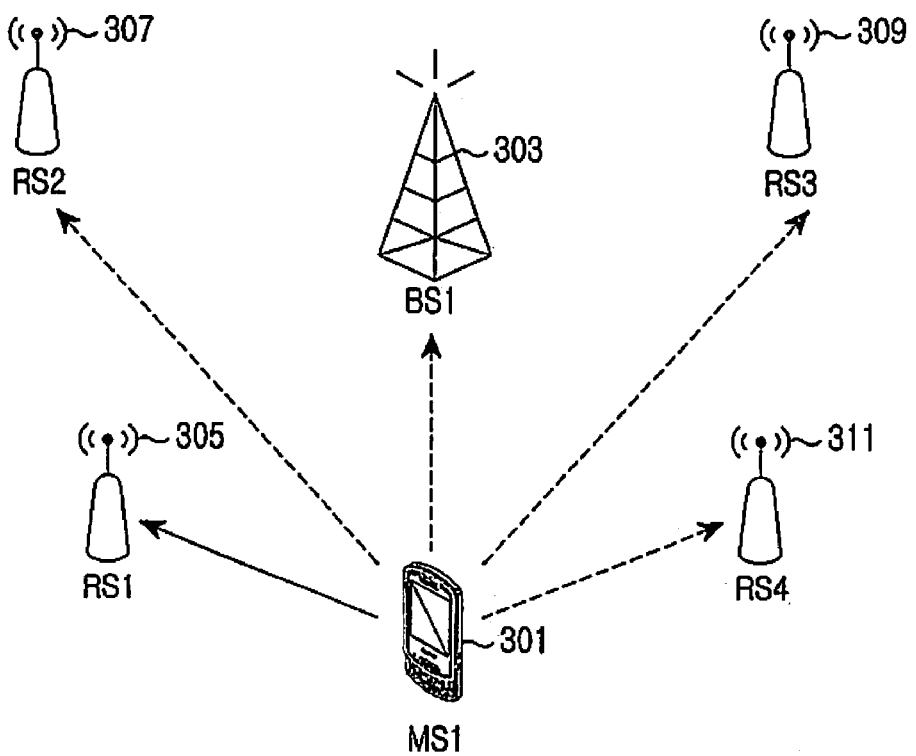

FIGS. 3A and 3B illustrate a signal interference model in a multi-hop relay BWA communication system according to the present invention.

Figure 1:
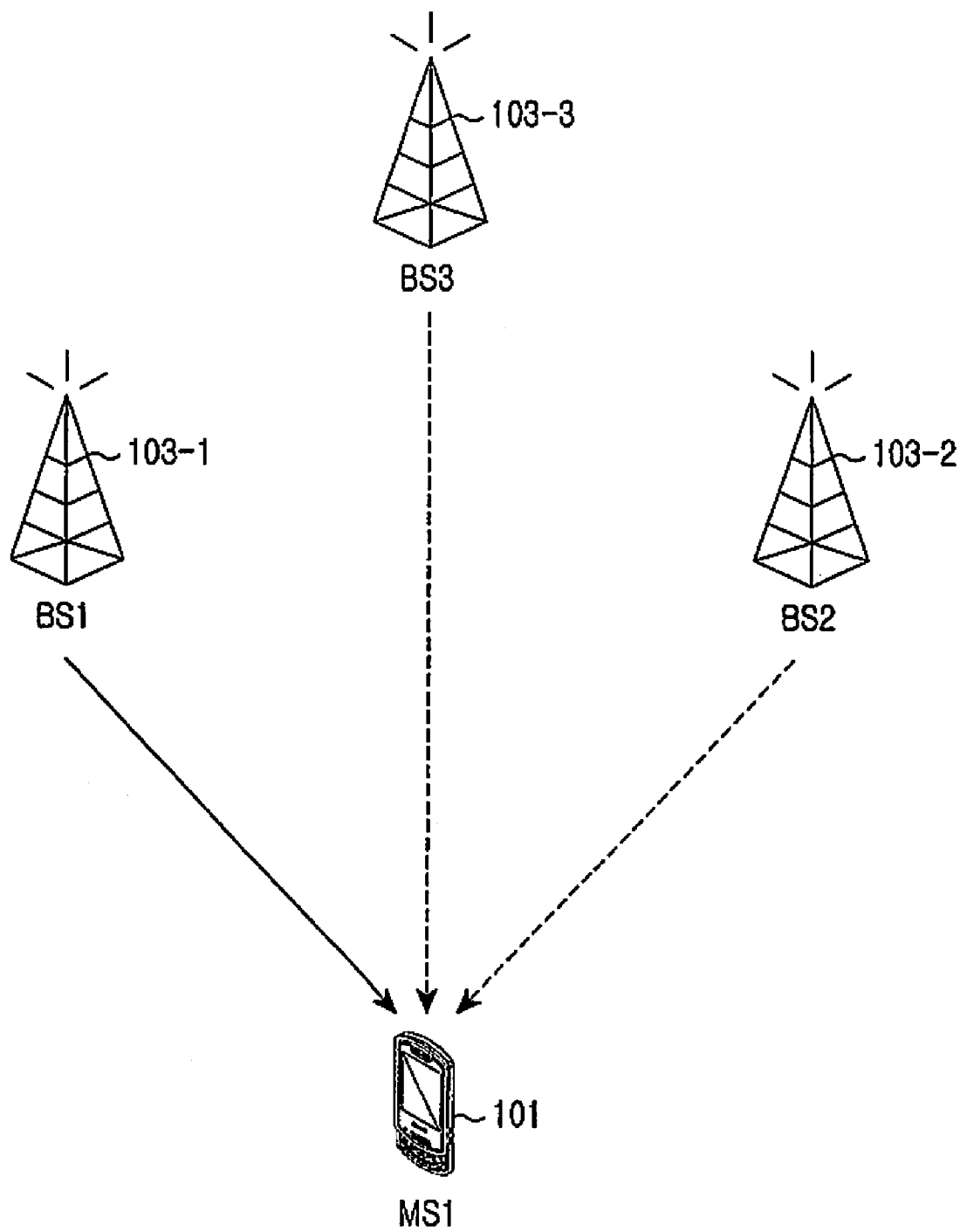
FIG. 1 illustrates a conventional scanning process for a handoff.
Figure 2:
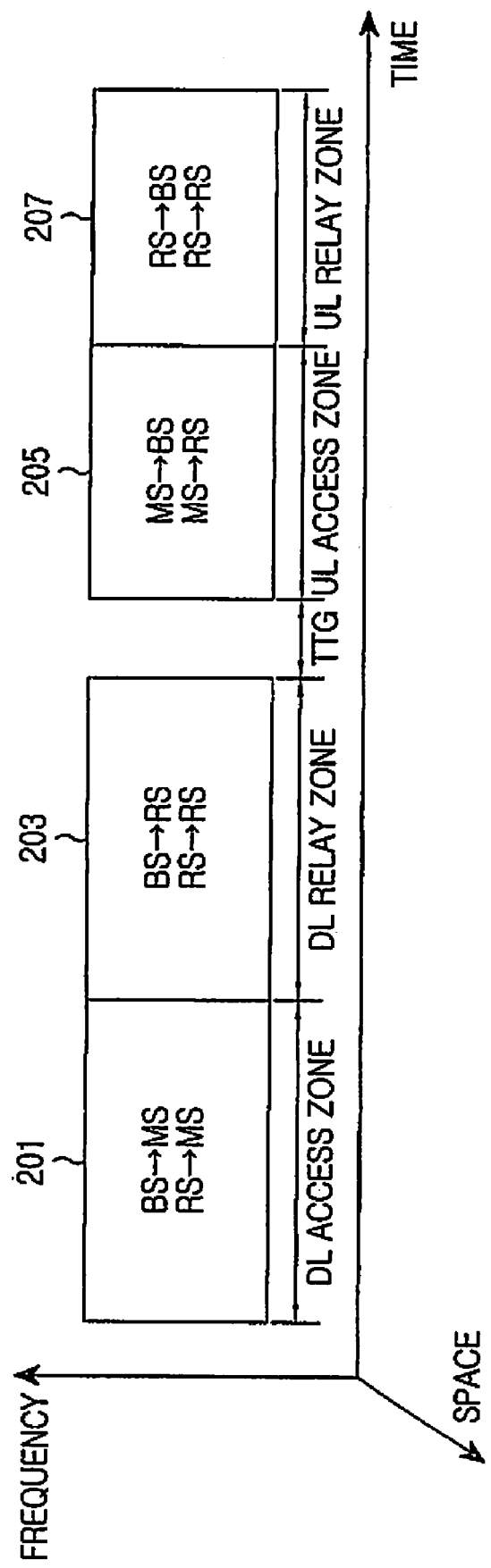
FIG. 2 illustrates a physical frame structure when communication takes place in a multi-hop environment in a conventional IEEE 802.16 OFDM system.

Referring to FIGS. 3A and 3B, a first MS 301 communicates with a first RS 305 in an access zone of FIG. 2. When wireless resources of time and frequency are equally used by a first BS 303 and second to fourth RSs 307, 309 and 311, the first MS 301 experiences signal interference from the first BS 303 and the second to fourth RSs 307, 309, and 311 in a DL direction (see FIG. 3A). In addition, in a UL direction (see FIG. 3B), a signal transmitted from the first MS 301 to the first RS 305 causes signal interference to the first BS 303 and the second to fourth RSs 307, 309, and 311. Likewise, in a relay zone of FIG. 2, when the wireless resources of time and frequency are equally used when an RS communicates with a BS or another RS, signal interference occurs to neighboring BSs and neighboring RSs.

Figure 4:
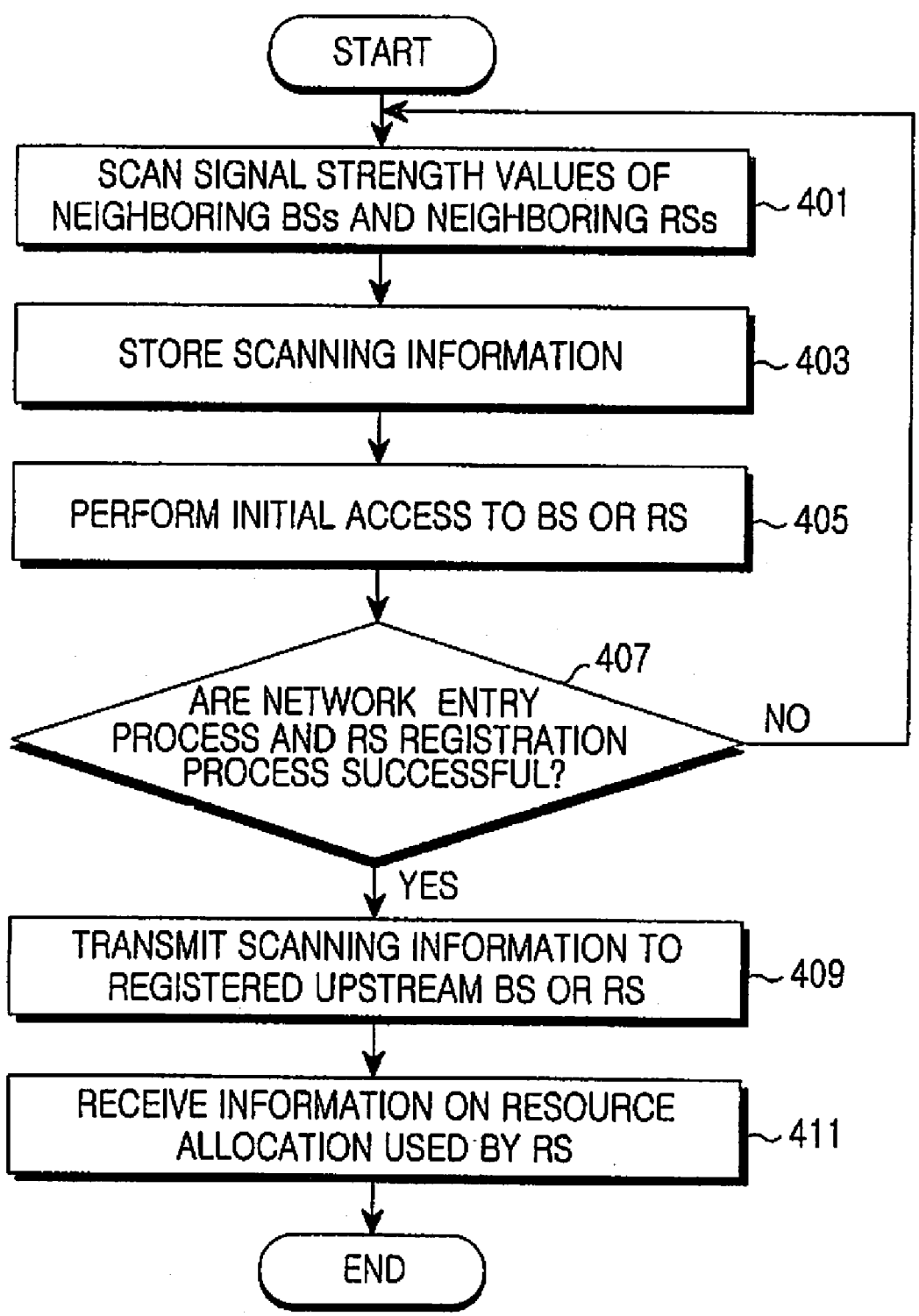
FIG. 4 illustrates an operation of an RS that maximizes resources by using scanning information of neighboring BSs and neighboring RSs, which is measured in an initial access process, in a multi-hop relay BWA communication system according to the present invention.

FIG. 4 illustrates an operation of an RS that maximizes resources by using scanning information of neighboring BSs and neighboring RSs, which is measured in an initial access process, in a multi-hop relay BWA communication system according to the present invention.

Referring to FIG. 4, when the multi-hop system is initially accessed, since there is no MS that receives a service from the RS, the RS may receive a preamble or pilot signal in an access zone of FIG. 2. Therefore, the RS scans the neighboring BSs and the neighboring RSs by using the preamble or pilot signal and thus measures signal strength in step 401. Scanning information is stored in step 403. In step 405, initial access is attempted to a BS (or RS) which is determined to have the best signal quality or which satisfies a specific condition. The initial access is performed to establish DL and UL synchronizations with the BS (or RS) to be accessed by the RS. Examples of the scanning information may include signal strength values, station IDentifications (IDs), and preamble indices of the neighboring BSs and the neighboring RSs. Further, since the signal strength values are stored for each ID or preamble index, it is possible to distinguish the signal strength values of all the neighboring BSs and the neighboring RSs.

In step 407, the RS performs a network entry process and an RS registration process, and determines whether the network entry process and the RS registration process have been successfully performed. If these processes have failed, the process returns to step 401 where the RS repeats the subsequent steps. If these processes have been successful, in step 409, the RS transmits the stored scanning information to the registered upstream BS (or RS). Upon receiving the scanning information, the upstream BS (or RS) determines a resource allocation which can be used by the RS, and transmits information on a resource allocation to the RS.

In step 411, the RS receives the information on the resource allocation to be used by the RS from the upstream BS (or RS), and thus can start multi-hop communication by using the received information. The information on the resource allocation may vary according to a resource allocation algorithm used in the BS. For example, the information may assign one or more RSs having less interference to one resource reuse group, indicate a resource use priority for a physical frame in a time or frequency domain, and indicate a time or frequency domain of a wireless resource that can be used by an RS. In addition, the information may be an indication about preamble or pilot channel used by an RS for a synchronization or scanning purpose in access zone or relay zone. There are numerous possibilities for implementing the resource allocation algorithm in the present invention. However, explanation thereof will not be given for the sake of conciseness.

Thereafter, the procedure of FIG. 4 ends.

Figure 5:
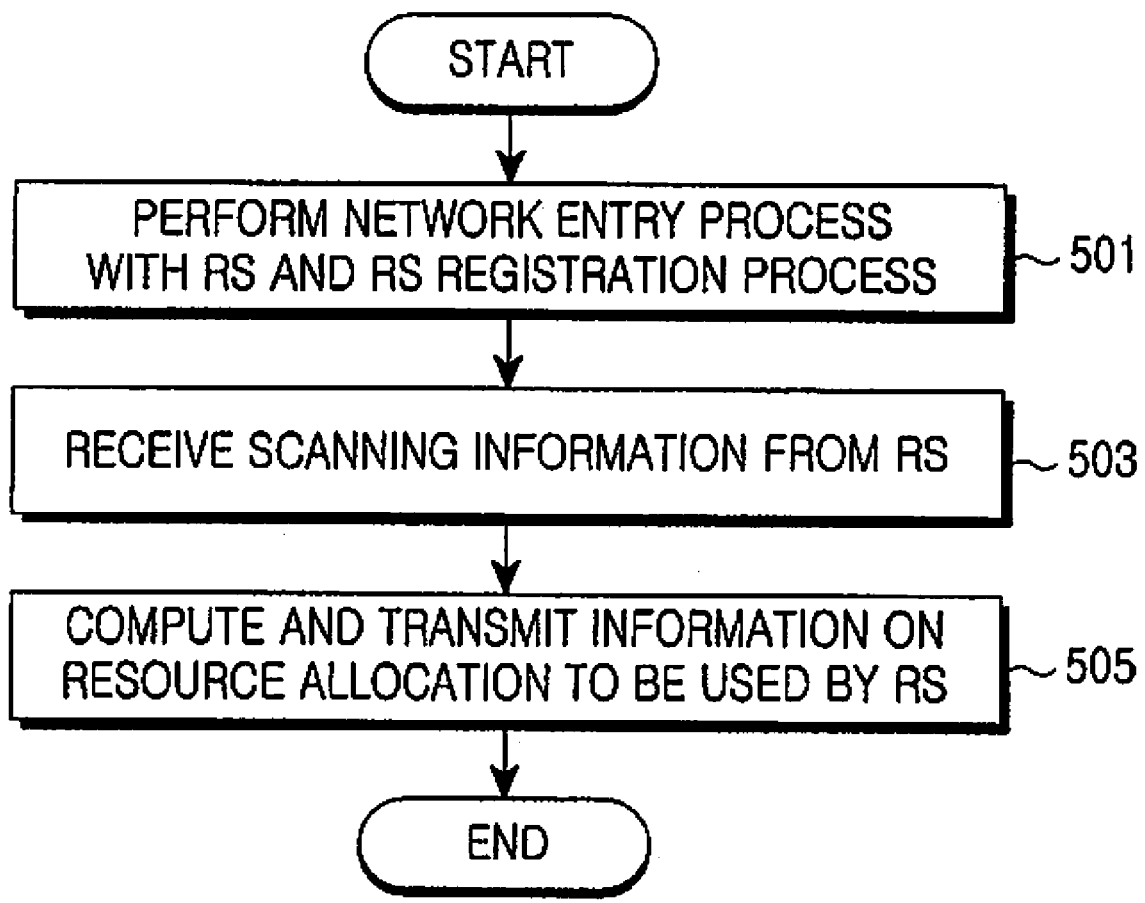
FIG. 5 illustrates an operation of a BS that controls an RS when resources are allocated by using scanning information of neighboring BSs and neighboring RSs, which is measured by the RS in an initial access process, in a multi-hop relay BWA communication system according to the present invention.

FIG. 5 illustrates an operation of a BS that controls an RS when resources are reused by using scanning information of neighboring BSs and neighboring RSs, which is measured by the RS in an initial access process, in a multi-hop relay BWA communication system according to the present invention.

Referring to FIG. 5, the BS performs a network entry process with the RS and an RS registration process in step 501. Then, the BS receives scanning information from the RS in step 503. In step 505, the BS computes a resource allocation to be used by the newly connected RS by using the received scanning information, and transmits information on the computed resource allocation to the RS. It has been described that the BS has a right to control resource allocation of the RS to be connected. However, if an apparatus having such a right exists in the same place as another RS downstream of the BS or an access control station of a BS upstream of the BS, the information on the resource allocation is transmitted to the RS from an entity where the apparatus having the control right exists. Thereafter, the procedure of FIG. 5 ends.

Figure 6:
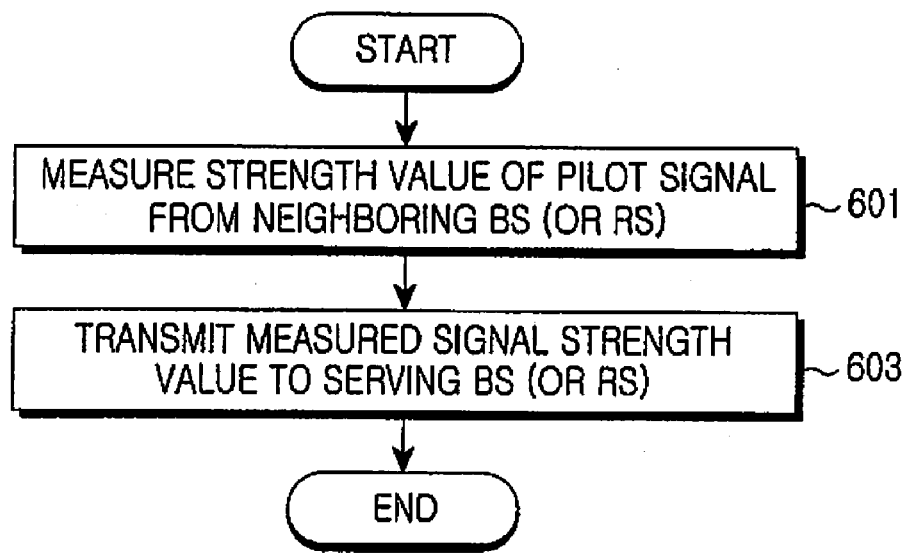
FIG. 6 illustrates an operation of an MS that scans neighboring BSs and neighboring RSs in a multi-hop relay BWA communication system according to the present invention.

FIG. 6 illustrates an operation of an MS that scans neighboring BSs and neighboring RSs in a multi-hop relay BWA communication system according to the present invention.

Referring to FIG. 6, in order to know an interference level of signals from the neighboring BSs and the neighboring RSs, the MS measures strengths of pilot signals from the neighboring BSs and the neighboring RSs, that is, performs scanning in step 601. Then, the MS transmits the measured signal strength values (i.e., scanning information) to a BS (or RS) currently connected to the MS in step 603. Thereafter, the procedure of FIG. 6 ends.

Figure 7:
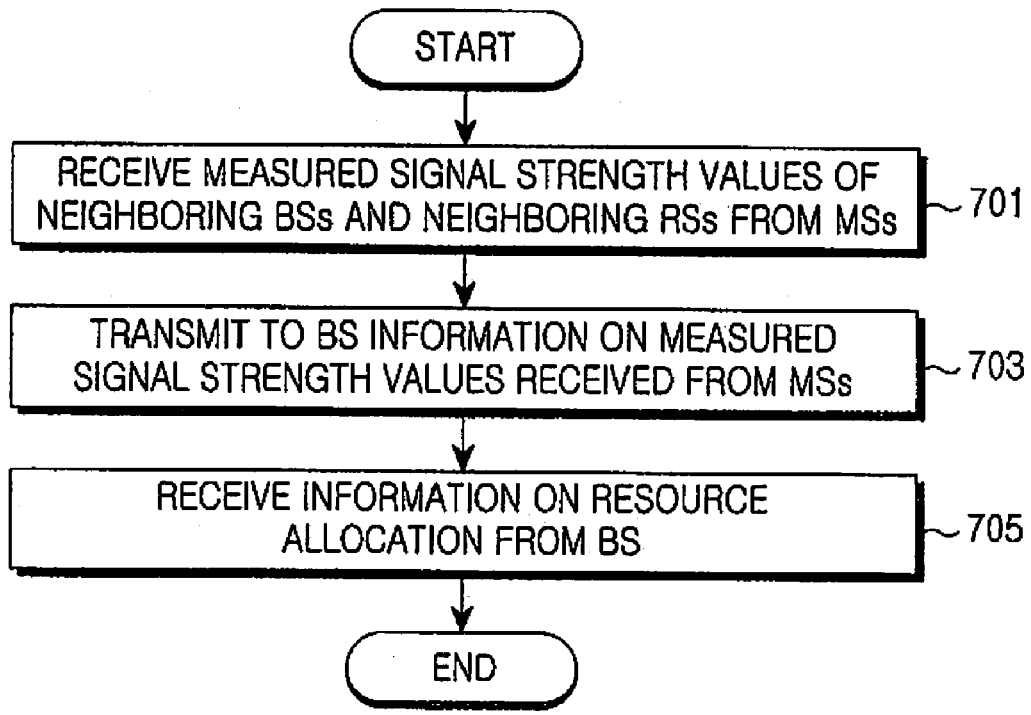
FIG. 7 illustrates an operation of an RS that maximizes resources by using scanning information of neighboring BSs and neighboring RSs, which is received from MSs, in a multi-hop relay BWA communication system according to the present invention.

FIG. 7 illustrates an operation of an RS that maximize resources by using scanning information of neighboring BSs and neighboring RSs, which is received from MSs, in a multi-hop relay BWA communication system according to the present invention.

Referring to FIG. 7, the RS receives signal strength values (i.e., scanning information) of the neighboring BSs and the neighboring RSs from the MSs currently connected to the RS in step 701. Herein, the signal strength values are measured by the MSs. The received values (i.e., scanning information) obtained by measuring signal strengths are transmitted to a BS in step 703. Then, the RS receives information on a resource allocation from the BS in step 705. If an upstream entity that controls an interference signal of the RS is not the BS, the RS performs all of the aforementioned processes with respect to the entity that controls the interference signal. Thereafter, the procedure of FIG. 7 ends.

Figure 8:
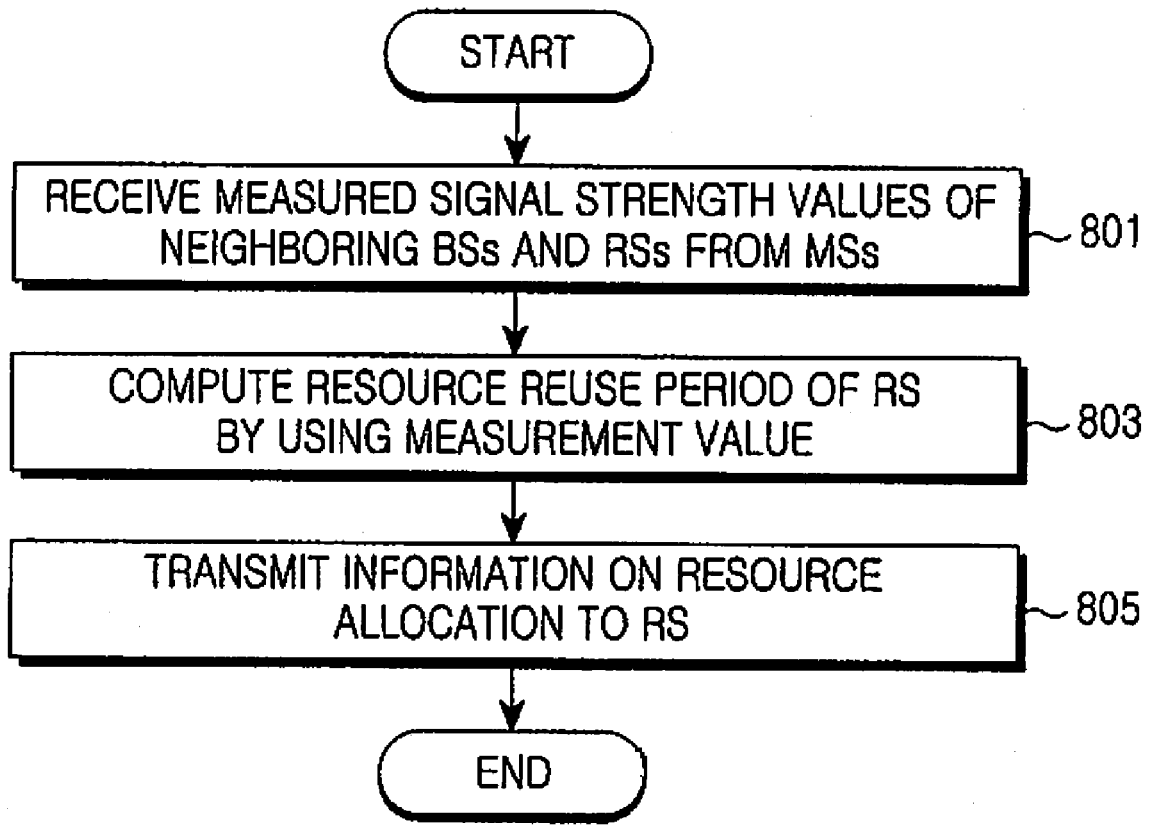
FIG. 8 illustrates an operation of a BS that controls an RS when the RS maximizes resources by using scanning information of neighboring BSs and neighboring RSs, which is received from MSs, in a multi-hop relay BWA communication system according to the present invention.

FIG. 8 illustrates an operation of a BS that controls an RS when the RS maximizes resources by using scanning information of neighboring BSs and neighboring RSs, which is received from MSs, in a multi-hop relay BWA communication system according to the present invention.

Referring to FIG. 8, the BS receives scanning information from the MSs connected directly to the BS or connected to the RS in step 801. Herein, the scanning information is a value obtained by measuring signal strengths of the neighboring BSs and the neighboring RSs. In step 803, by using the scanning information, the BS re-computes resource allocations of the BS and the RS, which have been determined in an initial access process. In step 805, the BS transmits information on the computed resource allocations to the RS. Thereafter, the procedure of FIG. 8 ends.

In FIG. 7, the RS receives the scanning information of the neighboring BSs and the neighboring RSs from the MSs, and transmits the received scanning information to the BS. As such, when the RS transmits scanning information of all MSs to the BS, a large amount of message overhead is produced. Thus, it is necessary for the RS to selectively transmit the scanning information of the MSs to the BS.

Figure 9:
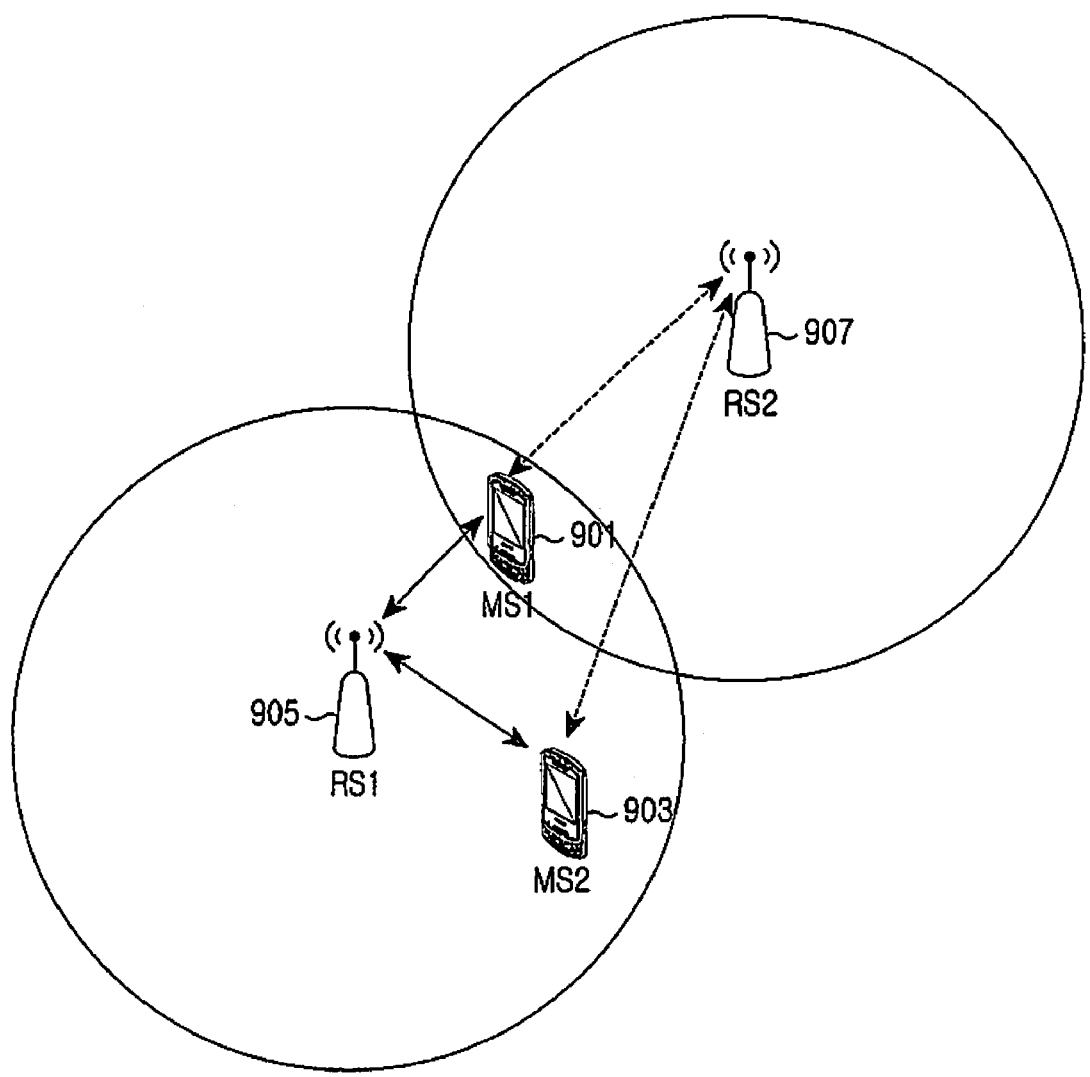
FIG. 9 illustrates the motivation for an RS to selectively transmit scanning information, which is received from MSs, to a BS in a multi-hop relay BWA communication system according to the present invention.

FIG. 9 illustrates the motivation for an RS to selectively transmit scanning information, which is received from MSs, to a BS in a multi-hop relay BWA communication system according to the present invention.

Referring to FIG. 9, a first RS 905 is a serving RS, to which is connected and a first MS 901 and a second MS 903. In addition, a second RS 907 interferes with the first RS 905. If the first MS 901 is closer in distance to the second RS 907 than the second MS 903, the first MS 901 experiences more interference with the second RS 907 than the second MS 903. When a pilot signal strength of the second RS 907 is measured by the first MS 901 and the second MS 903 and is then reported to the BS via the first RS 905, the BS computes a resource allocation according to the first MS 901 that experiences more interference with the second RS 907 than the second MS 903. Therefore, even if the first RS 905 reports to the BS only a signal strength of the second RS 907 received from the first MS 901, there is no problem for the BS to determine an interference level of the second RS 907.

Although there are many methods used by the RS to select the MSs that transmit scanning information to the BS, the following embodiments will be described in the present invention.

According to a first embodiment of the present invention, an RS receives scanning information of neighboring BSs and neighboring RSs other than the RS itself from MSs. Thereafter, among the received scanning information, only scanning information of an MS that has an interference signal having a strength that is greater than a threshold is reported to a BS. That is, when an RSSI value or a CINR value of an interference signal of an $i^{th}$ RS (or BS) is measured by a $j^{th}$ MS, only scanning information of a $j^{th}$ MS for which an RSSI or CINR value satisfies a threshold is selected and transmitted to the BS. This can be expressed by Equation (1) below.

$$[RSSI_{R(B)S_i\text{-}MS_j}] = RSSI_{R(B)S_i\text{-}MS_j}, \text{ (if,}$$
$$RSSI_{R(B)S_i\text{-}MS_j} \geq RSSI_{Threshold})$$
$$[CINR_{R(B)S_i\text{-}MS_j}] = CINR_{R(B)S_i\text{-}MS_j},$$
$$\text{(if, } CINR_{R(B)S_i\text{-}MS_j} \geq CINR_{Threshold}) \quad (1)$$

According to a second embodiment of the present invention, an RS receives scanning information of neighboring BSs and neighboring RSs other than the RS itself from MSs, and then reports to a BS only RSSI values or CINR values, that is, a number of pieces of scanning information having the greatest value for each neighboring BS and neighboring RS. For example, in Table 1 below, pieces of scanning information of each neighboring BS and neighboring RS, which are received by the RS from the MSs, are listed according to magnitudes. Although the RS can report all values listed in sorted order in Table 1 to the BS, in order to reduce an overhead, the RS may report to the BS one or more values having the greatest value for each neighboring BS and neighboring RS. As such, the BS may estimate an interference level experienced by the MSs by using only one or two values received from the RS, and thus compute a resource allocation.

TABLE 1

| Sorting Order | BS | RS2 | RS3 | ... | RSM |
|---|---|---|---|---|---|
| 1 | −20 dB(m) | −41 dB(m) | −38 dB(m) | | −50 dB(m) |
| 2 | −22 dB(m) | −48 dB(m) | −48 dB(m) | | −60 dB(m) |
| 3 | −28 dB(m) | −51 dB(m) | −52 dB(m) | | −80 dB(m) |
| ... | | | | | |
| N | −60 dB(m) | −80 dB(m) | −60 dB(m) | | −100 dB(m) |

According to a third embodiment of the present invention, an RS receives scanning information of neighboring BSs and neighboring RSs other than the RS itself from MSs. Then, by combining the first and second embodiments, pieces of scanning information of the MSs are sorted as shown in Table 1 above, wherein the scanning information satisfies a threshold. Only one or more information pieces having the greatest values for each neighboring BS and neighboring RS are selected and transmitted to a BS.

When an RS selects an MS that transmits scanning information to a BS, a selection method may be determined by the RS. Alternatively, the selection method may be determined by the BS and is then reported to the RS. In this case, a message field is required so that the BS reports the determined selection method to the RS.

If the selection method determined by the BS is the same as described in the first embodiment, the BS may transmit to the RS a first message filed that indicates an RSSI or CINR value which is used as a reference value. If the selection method determined by the BS is the same as described in the second embodiment, the BS may transmit to the RS a second message field that indicates the number of data values selected and reported for the BS or the RS. If the selection method determined by the BS is the same as described in the third embodiment, the BS may transmit to the RS both the first and second message fields described above. Upon receiving any one of the message fields, the RS reports to the BS the RSSI or CINR value according to a corresponding embodiment.

Meanwhile, after the initial access is performed, in order to transmit a preamble or pilot signal to the MSs that receive services, the RS is no longer able to measure preamble and pilot signals of the neighboring BSs and the neighboring RSs, and is thus unable to transmit a scanning result to the BS. Optionally, the RS may temporarily terminate communication with the MSs, and thus measure the preamble and pilot signals transmitted from the neighboring BSs and the neighboring RSs and report a scanning result to the BS.

Figure 10:
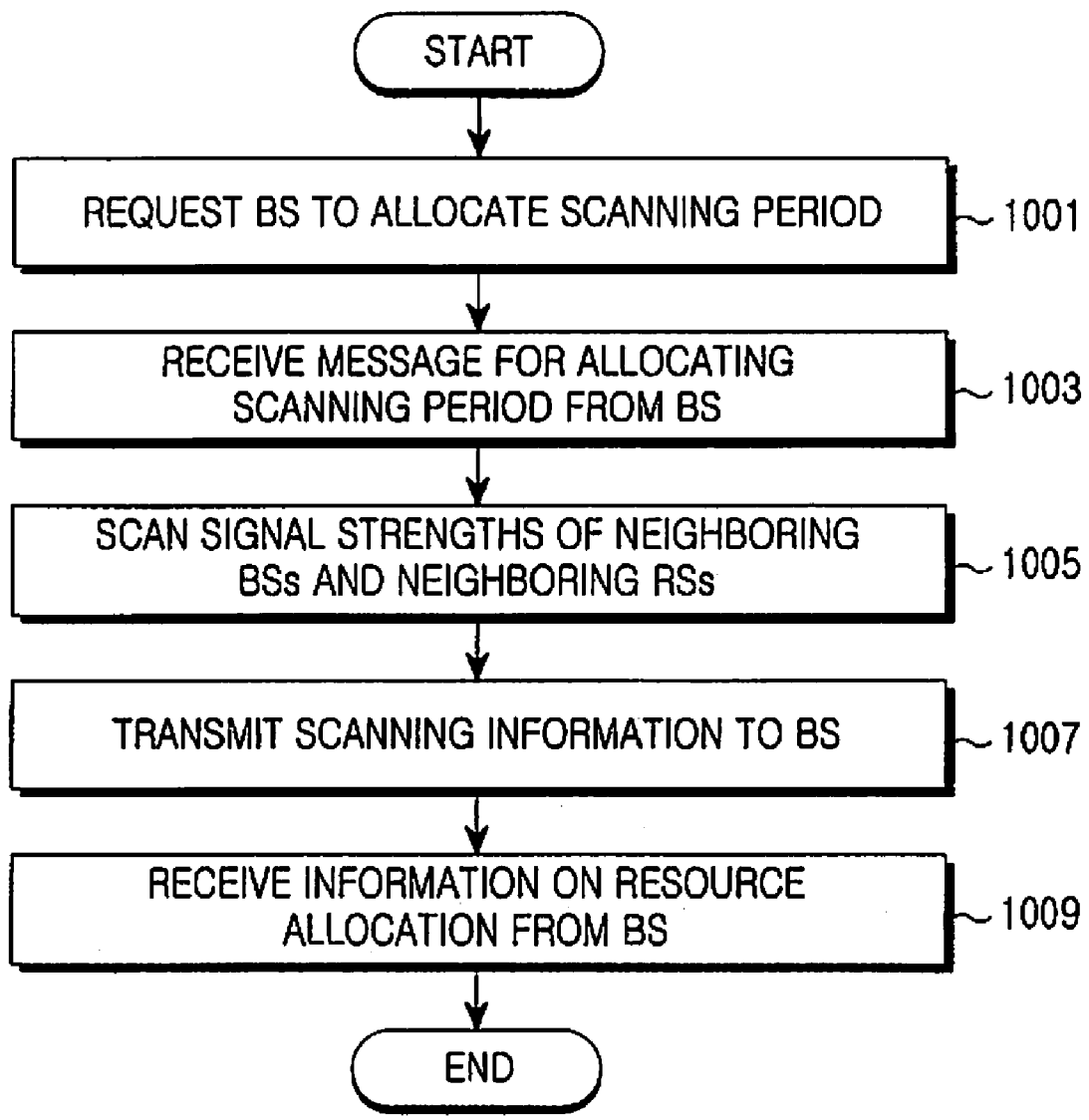
FIG. 10 illustrates an operation of an RS that maximizes resources by using scanning information of neighboring BSs and neighboring RSs, which is measured after an initial access process is performed, in a multi-hop relay BWA communication system according to the present invention.

FIG. 10 illustrates an operation of an RS that maximize resources by using scanning information of neighboring BSs and neighboring RSs, which is measured after an initial access process is performed, in a multi-hop relay BWA communication system according to the present invention.

Referring to FIG. 10, the RS requests a BS to allocate a scanning period in step 1001. In step 1003, the RS receives a message for allocating the scanning period from the BS. When BS let RS scan neighboring stations, step 1001 may be omitted. In step 1005, the RS measures strengths of interference signals by scanning the neighboring BSs and the neighboring RSs, which transmit a preamble or pilot signal in an relay zone or access zone of FIG. 2 for the purpose of synchronization or scanning. As described above, the scanning period may be allocated when the RS determines that scanning is needed and thus requests the BS to allocate the scanning period. Alternatively, however, the scanning period may be allocated when the BS determines that the RS needs to perform scanning and thus allocates the scanning period to the RS. In addition, the neighboring BSs and the neighboring RSs to be scanned may be determined by the BS and neighboring stations' information to be scanned thereof may be included in the message for allocating the scanning period. Alternatively, the neighboring BSs and the neighboring RSs to be scanned may be determined by the RS itself. Steps 1001 and 1003 are performed only when the BS allocates the scanning period. Since the scanning period and the neighboring BSs and the neighboring RSs to be scanned can be determined by the RS, steps 1001 and 1003 may be skipped when scanning is determined and performed by the RS. In this case, the procedure begins with step 1005.

In step 1007, the RS transmits measured values of signal strengths (i.e., scanning information) to the BS. In step 1009, the RS receives information on a resource allocation from the BS during the allocated scanning period. Then, the procedure of FIG. 10 ends.

Figure 11:
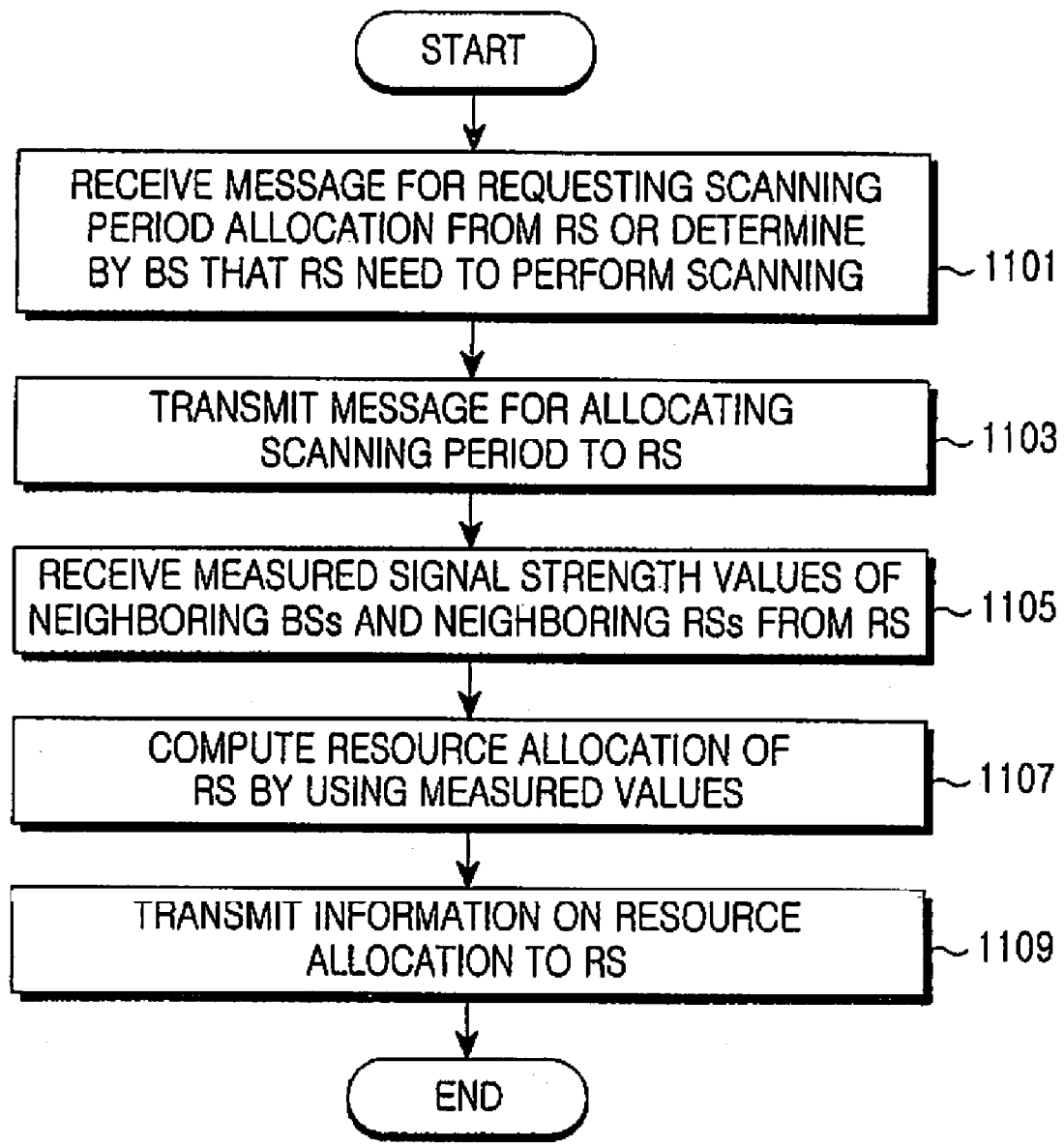
FIG. 11 illustrates an operation of a BS that controls an RS when the RS maximizes resources by using scanning information of neighboring BSs and neighboring RSs, which is measured after an initial access process is performed, in a multi-hop relay BWA communication system according to the present invention.

FIG. 11 illustrates an operation of a BS that controls an RS when the RS maximizes resources by using scanning information of neighboring BSs and neighboring RSs, which is measured after an initial access process is performed, in a multi-hop relay BWA communication system according to the present invention.

Referring to FIG. 11, the BS receives a message for requesting scanning period allocation from the RS or determines that the RS needs to perform scanning in step 1101.

Thereafter, the BS allocates the scanning period to the RS. In step 1103, the BS transmits a message for allocating the scanning period to the RS. The message may include information on the neighboring BSs and the neighboring RSs to be scanned by the RS. When the scanning period and the neighboring BSs and the neighboring RSs to be scanned can be determined by the RS, steps 1101 and 1103 may be skipped when scanning is determined and performed by the RS. In this case, the procedure begins with step 1105.

In step 1105, the BS receives scanning information from the RS, wherein the scanning information indicates measured values of signal strengths of neighboring BSs and neighboring RSs. In step 1107, by using the received scanning information, the BS computes a resource allocation of the RS. In step 1109, the BS transmits information on the computed resource allocation to the RS.

Thereafter, the procedure of FIG. 11 ends.

As mentioned above, in the initial access process, in order to know the neighboring BSs and the neighboring RSs that interfere with the RS itself, the RS measures interference signals from the neighboring BSs and the neighboring RSs. If the BS (or RS) includes a device capable of measuring a coordination value, for example, similar to a Global Positioning System (GPS), then the RS may report its coordination value to the BS without having to measure the interference signals as described above. Therefore, the BS can compute a resource allocation according to information on the neighboring BSs and the neighboring RSs close in distance from the RS that reports the coordination value. In the following descriptions, the position coordination value is a GPS value for example, wherein the GSP value is a three-dimensional coordination value including latitude, longitude, and altitude.

Figure 12:
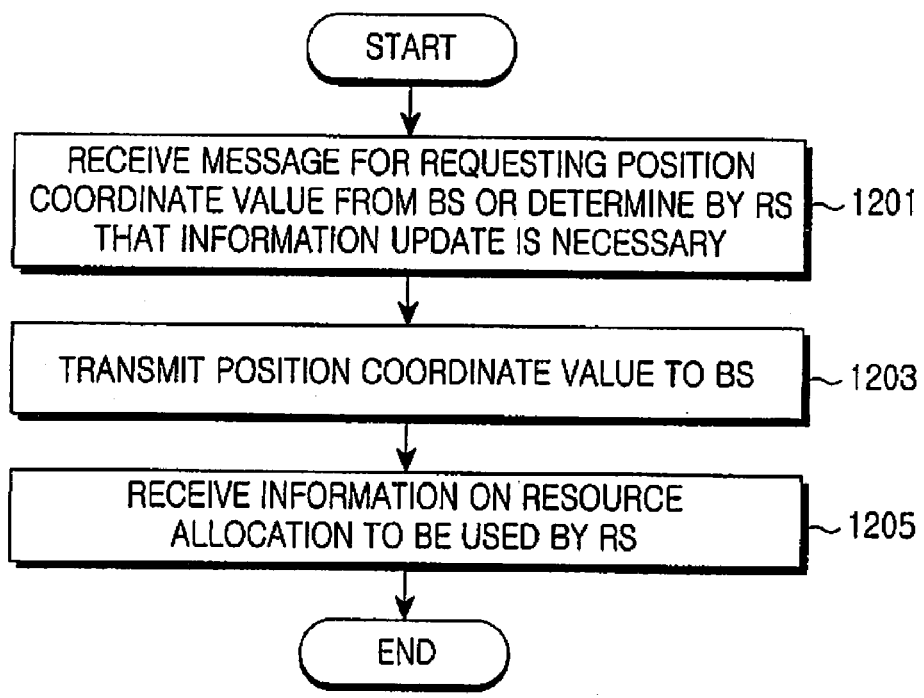
FIG. 12 illustrates an operation of an RS that maximizes resources by using a position coordination value in a multi-hop relay BWA communication system according to the present invention.

FIG. 12 illustrates an operation of an RS that maximizes resources by using a position coordination value in a multi-hop relay BWA communication system according to the present invention.

Referring to FIG. 12, in step 1201, the RS receives a message for requesting a position coordinate value from a BS or determines that information update is necessary for a resource allocation when or after initial access is carried out. In step 1203, the RS transmits its position coordination value to the BS. In step 1205, the RS receives information on the resource allocation to be used by the RS itself from the BS. Thereafter, the procedure of FIG. 12 ends.

Figure 13:
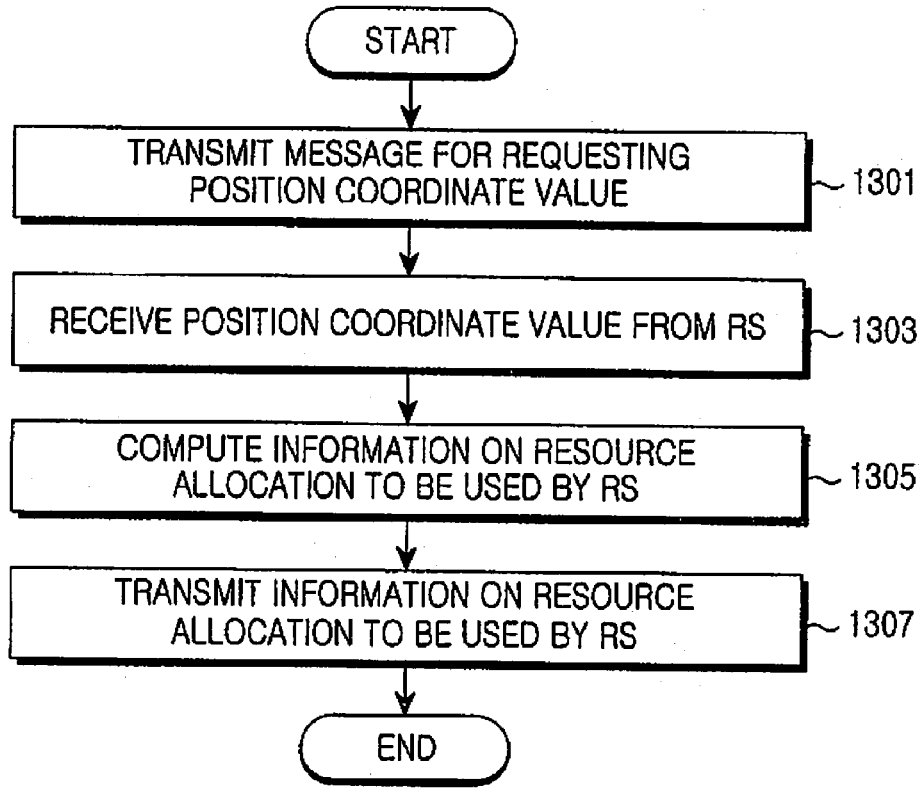
FIG. 13 illustrates an operation of a BS that controls an RS when the RS maximizes resources by using a position coordinate value in a multi-hop relay BWA communication system according to the present invention.

FIG. 13 illustrates an operation of a BS that controls an RS when the RS maximizes resources by using a position coordinate value in a multi-hop relay BWA communication system according to the present invention.

Referring to FIG. 13, in step 1301, the BS transmits to the RS a message for requesting a position coordinate value of the RS. In step 1303, the BS receives the position coordinate value from the RS. In step 1305, the BS computes a resource allocation to be used by the RS according to information on the neighboring BSs and the neighboring RSs close in distance to the received position coordinate value of the RS. In step 1307, the BS transmits information on the computed resource allocation to the RS. Thereafter, the procedure of FIG. 13 ends.

The BS may use both a first resource reuse method using scanning information as described in FIG. 4 to FIG. 11 and a second resource reuse method using a position coordinate value as described in FIGS. 12 and 13. That is, in an initial access process, the RS may simultaneously transmit to the BS the scanning information of the neighboring BSs and the neighboring RSs of FIG. 4 and the position coordinate value of FIG. 12, and thus the BS may compute a resource allocation of the RS by using the received scanning information and position coordinate value. In addition, as described in FIG. 7 or FIG. 10, when the scanning information received from the MSs or scanning information obtained by the RS are transmitted to the BS, the RS also transmits the position coordinate value of FIG. 12 to the BS, so that the BS can compute the resource allocation of the RS.

In FIG. 6 to FIG. 11, the BS may control scanning operations of a plurality of MSs or RSs as follows. When the BS reports in advance, to the MSs or the RS, information on the neighboring BSs and the neighboring RSs to be scanned, when scanning is frequently performed for all of the neighboring BSs and the neighboring RSs, frequent scanning results in an increased overhead. Therefore, the BS may classify the neighboring BSs and the neighboring RSs to be scanned into groups and inform the RSs or the MSs of the classification result. That is, with respect to a first RS (or MS) among a plurality of BSs or RSs, some BSs or RSs, which are adjacent to the first RS (or MS), and mobile RSs are classified in to a frequent-scanning group. Some neighboring BSs and neighboring RSs, which are far from the first RS (or MS) and thus interference is not significant, and fixed RSs are classified into a long-period scanning group. By informing the MSs or the RSs of group information, the MSs or the RSs can report scanning information to the BS according to a time period of the other group. In this manner, an overhead of the scanning information of the neighboring BSs and the neighboring RSs can be effectively reduced when the scanning information is sent from the MSs or the RSs to the BS.

In FIGS. 10 and 11, after the initial access process is performed, the RS communicates with the MSs that receive services from the RS itself in the access zone and communicates with the BS or another RS in the relay zone. The operation of the RS that reuses resources by using the scanning information of the neighboring BSs and the neighboring RSs is described in FIG. 10, wherein the scanning information is measured after the initial access process is performed. A specific signal to be measured by the RS in order to measure strengths of interference signals will be described with reference to FIG. 14.

Figure 14:
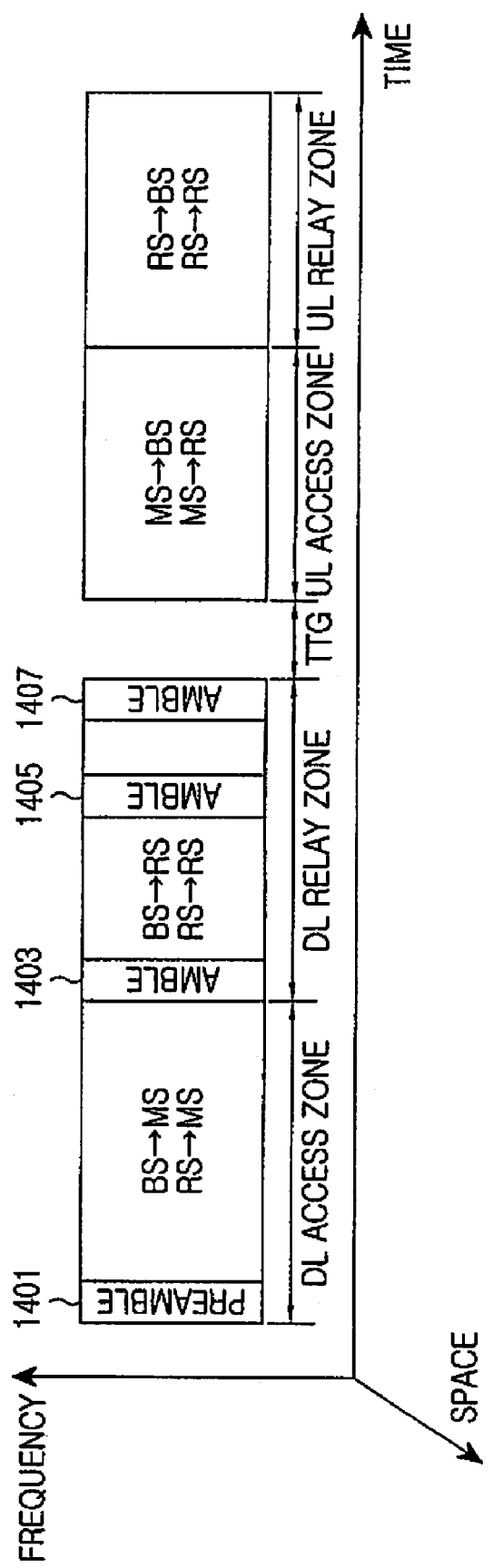
FIG. 14 illustrates a method of measuring signal strengths of neighboring BSs and neighboring RSs, to which an RS transmits an interference signal, in a multi-hop relay BWA communication system according to the present invention.

FIG. 14 illustrates a method of measuring signal strengths of neighboring BSs and neighboring RSs, to which an RS transmits an interference signal, in a multi-hop relay BWA communication system according to the present invention.

Referring to FIG. 14, for measuring the strength of the interference signal of the RS, two methods are used as follows. In a first method, the RS measures the strength of the interference signal by using a preamble 1401 of each of the neighboring BSs and the neighboring RSs in an access zone. When using the first method, an additional overhead that reduces a wireless resource does not occur. However, while the RS measures the preamble 1401 of each of the neighboring BSs and the neighboring RSs, the RS cannot communicate with an MS that is currently receiving a service from the RS. The RS measures an RSSI value or a CINR value of the preamble 1401 transmitted from the neighboring BS and the neighboring RS and transmits the measurement result to a BS as shown in FIG. 10.

In a second method, the RS measures the strength of the interference signal by using ambles 1403, 1405, and 1407 transmitted between neighboring BSs and neighboring RSs in a relay zone. The ambles 1403, 1405, and 1407 are symbols transmitted for synchronization between a BS and an RS or between two RSs in a DL direction in the relay zone. The ambles 1403, 1405, and 1407 may be located at a first symbol (i.e., preamble) 1403 of the DL relay zone or a middle symbol (i.e., mid-amble) 1405, or a last symbol (i.e., post-amble) 1407. When an RS knows location information on the ambles 1403, 1405, and 1407, the RS can measure RSSI or CINR values of the ambles 1403, 1405, and 1407 transmitted from the neighboring BS and the neighboring RS and transmit the measurement result to the BS as shown in FIG. 10.

Figure 15:
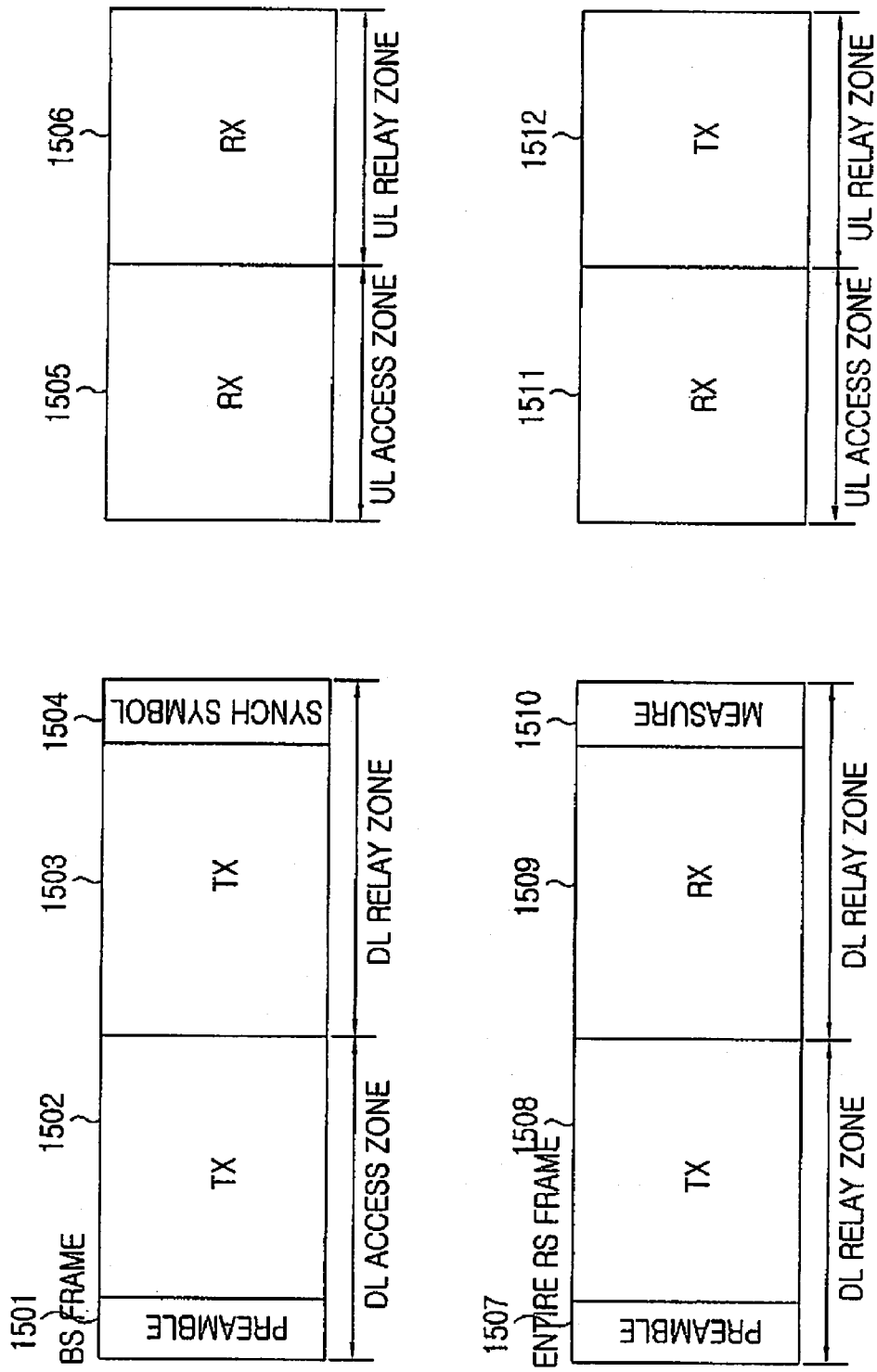
FIG. 15 illustrates a method of measuring signal strengths of neighboring BSs and neighboring RSs, to which an MS and an RS transmit interference signals, in a two-hop relay BWA communication system according to the present invention.

FIG. 15 illustrates a method of measuring signal strengths of neighboring BSs and neighboring RSs, to which an MS and an RS transmit interference signals, in a two-hop relay BWA communication system according to the present invention.

Referring to FIG. 15, in the two-hop environment, physical frame structures of a BS and the RS each include a DL sub-frame and a UL sub-frame. A first period of the DL or UL sub-frame includes access zones 1502, 1505, 1508, and 1511. A second period of the DL or UL sub-frame includes relay zones 1503, 1506, 1509, and 1512. The access zones 1502, 1505, 1508, and 1511 are periods in which the BS or the RS communicates with MSs. The relay zones 1503, 1506, 1509, and 1512 are periods in which the BS communicates with the RS.

In order to measure an interference signal from the neighboring BSs and the neighboring RSs, the MSs measure a signal strength of a preamble 1501 or 1507 in the DL access zone 1502 or 1508 of the BS or the RS and thus report scanning information to the BS or the RS. In this case, the RS retransmits to the BS the scanning information reported from the MSs.

Further, in order to measure the interference signal from the BS, the RS measures (during a period indicated by 1510) a strength of a synch symbol 1504 or a pilot signal transmitted in the DL relay zone 1503 of the BS frame.

Figure 16:
FIG 16 illustrates a method of measuring a signal strength of one RS group, to which at least one or more RSs transmit signature signals, in a two-hop relay BWA communication system according to the present invention.

FIG. 16 illustrates a method of measuring a signal strength of one RS group, to which at least one or more RSs transmit signature signals, in a two-hop relay BWA communication system according to the present invention.

Referring to FIG. 16, one RS group transmits a signature signal 1605 or 1608, which includes a pilot signal, or a synch symbol for the synchronization or scanning purpose, each of which is used for identification to measure the interference signal, in a DL relay zone 1603 or a UL relay zone 1607. A plurality of remaining RSs other than one RS group measure (during a period indicated by 1612 or 1616) a strength of the interference signal by using the signature signal, the pilot signal, or the synch symbol.

A Relay-Receive/transmit Transition Gap (R-RTG) 1604 is inserted in front of the signature signal 1605 in the DL relay zone 1603 of one RS group. A Relay-Transmit/receive Transition Gap (R-TTG) 1615 is inserted in front of the measurement period 1616 in the UL relay zone 1614 of the remaining RSs other than one RS group.

Figure 17:
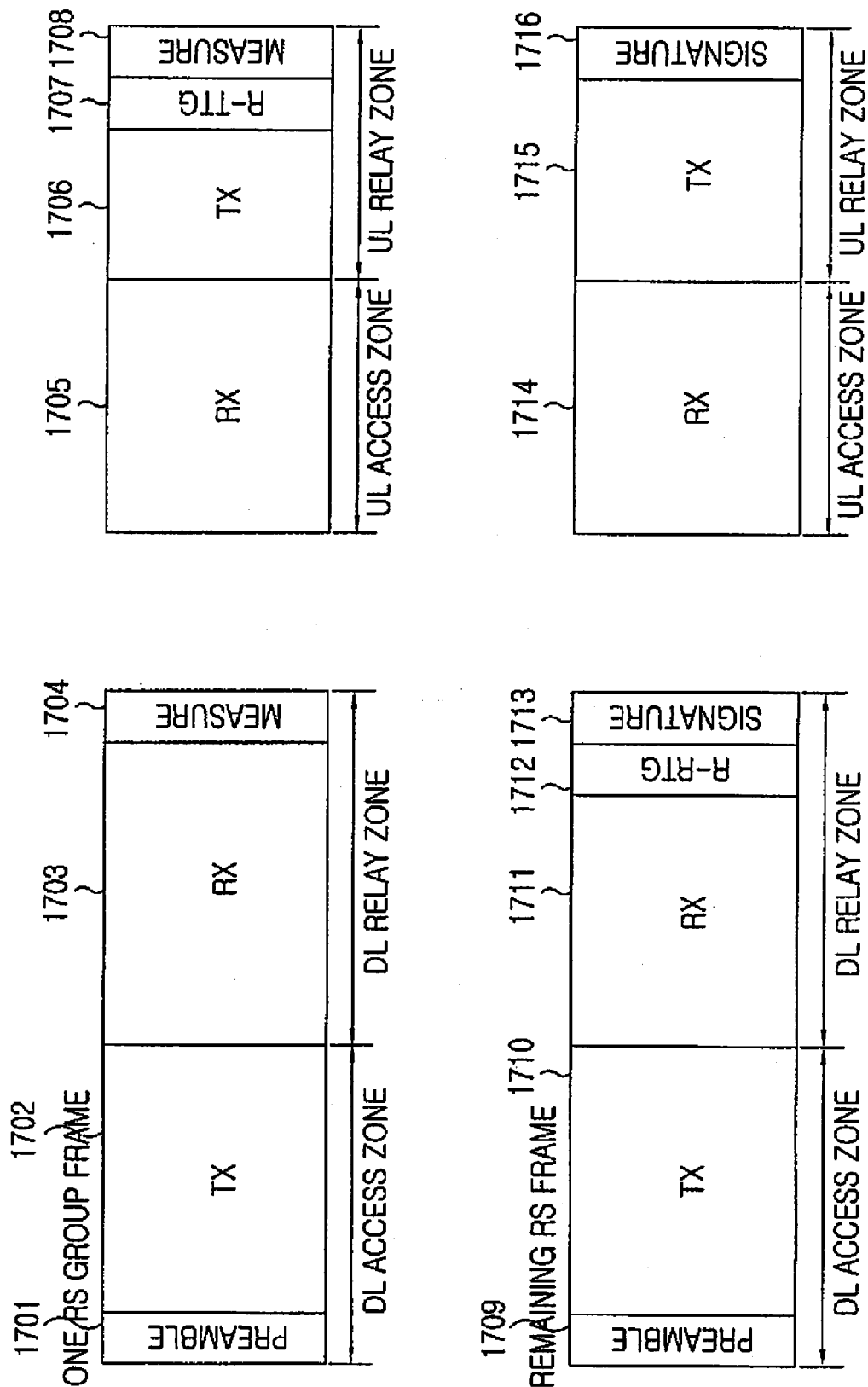
FIG. 17 illustrates a method in which one RS group measures signal strengths of at least one or more RSs that transmit signature signals in a two-hop relay BWA communication system according to the present invention.

FIG 17 illustrates a method in which one RS group measures signal strengths of at least one or more RSs that transmit signature signals in a two-hop relay BWA communication system according to the present invention.

Referring to FIG. 17, the plurality of RSs transmit a signature signal 1713 or 1716, which includes a pilot signal, or a synch symbol for the synchronization or scanning purpose, each of which is used for identification to measure the interference signals, in a DL relay zone 1711 or a UL relay zone 1715. One RS group measures (during a period indicated by 1704 or 1708) strengths of the interference signals by using the signature signal, the pilot signal, or the synch symbol, and reports the measurement result to a BS.

An R-RTG 1712 is inserted in front of the signature signal 1713 in the DL relay zone 1711 of the plurality of RSs. An R-TTG 1707 is inserted in front of the measurement period 1708 in the UL relay 1706 of one RS group.

Figure 18:
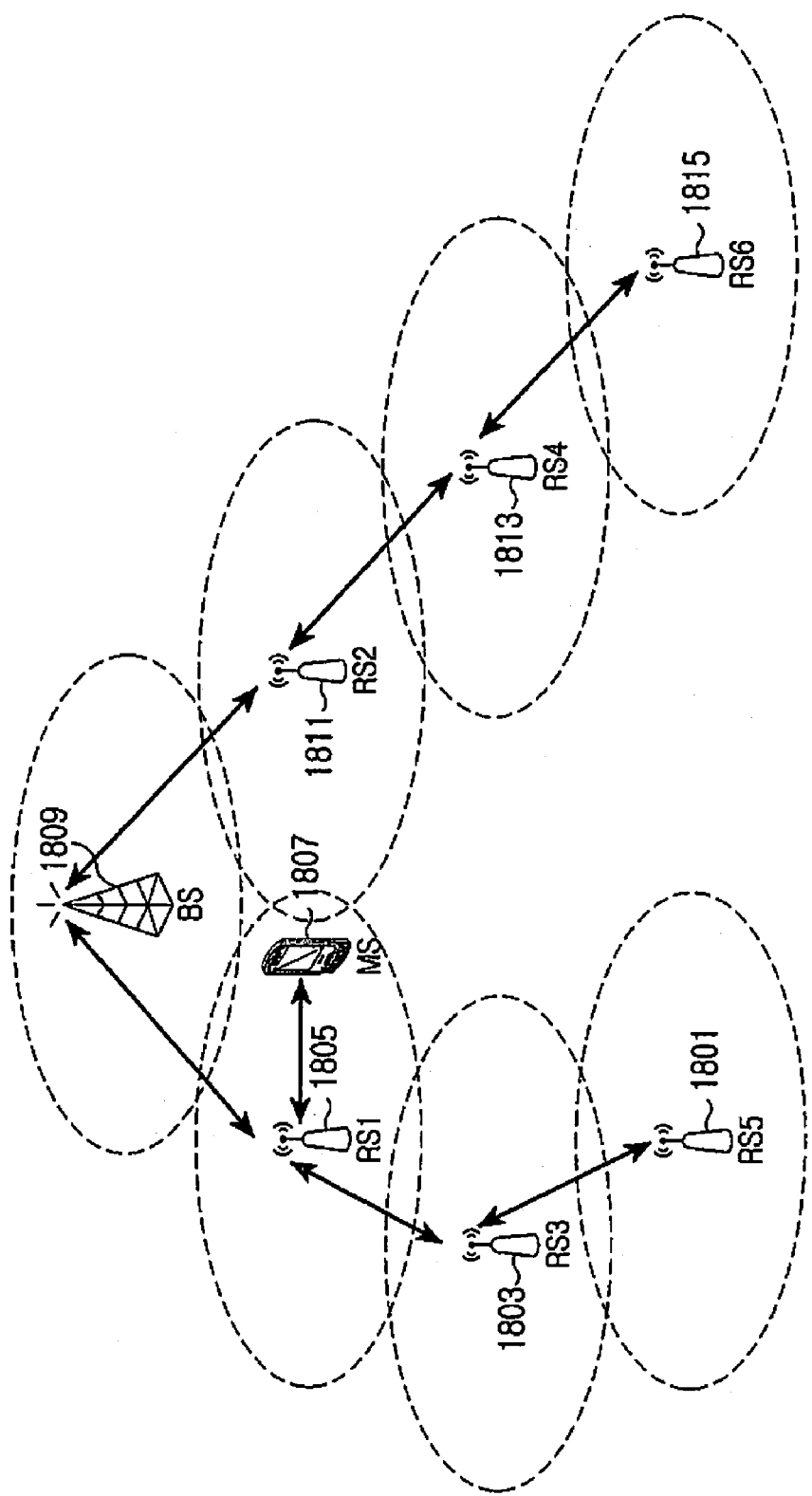
FIG. 18 illustrates a multi-hop communication arrangement according to the present invention.

FIG. 18 illustrates a multi-hop communication arrangement according to the present invention. It will be assumed herein that a BS 1809 and a plurality of RSs 1801, 1803, 1805, 1811, 1813, and 1815 have their own cell areas and communicate with MSs in the cell areas.

Referring to FIG. 18, the BS 1809 transmits data to the fifth RS (RS5) 1801 via the first RS (RS1) 1805 and the third RS (RS3) 1803. Further, the BS 1809 transmits data to the sixth RS (RS6) 1815 via the second RS (RS2) 1811 and the fourth RS (RS4) 1813.

Figure 19:
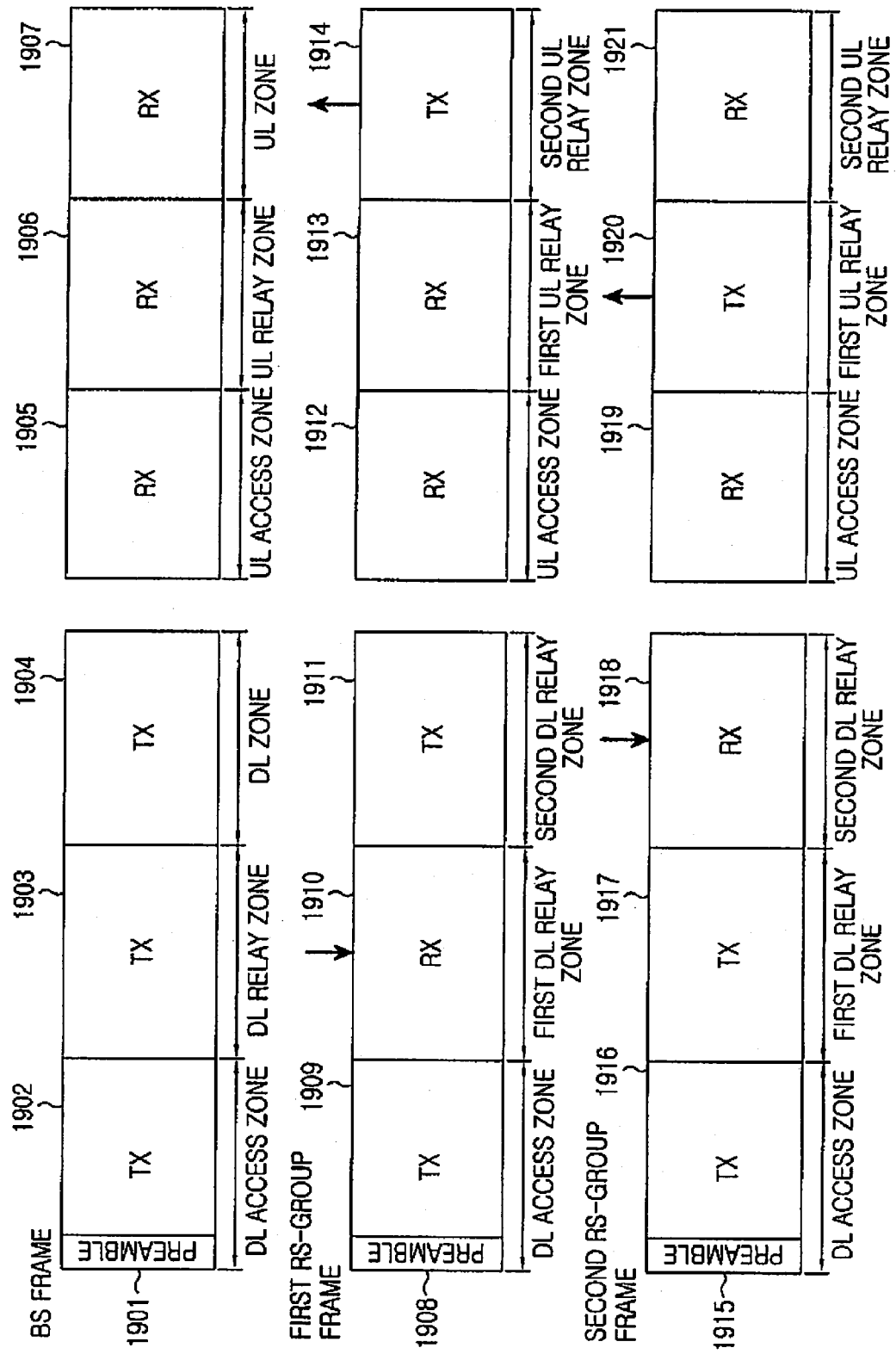
FIG. 19 illustrates frame structures of a BS and an RS in a multi-hop relay BWA communication system according to the present invention.

FIG. 19 illustrates frame structures of a BS and an RS in a multi-hop relay BWA communication system according to the present invention.

Referring to FIG. 19, a frame includes a BS frame, a first RS-group frame, and a second RS-group frame. There are various ways of grouping RSs. For example, in FIG. 18, RS1 1805, RS5 1801, RS2 1811, and RS6 1815, each of which corresponds to an odd hop, are classified into a first RS-group, and RS3 1803 and RS4 1813, each of which corresponds to an even hop, are classified into a second RS-group.

The BS frame includes access zones 1902 and 1905, relay zones 1903 and 1906, and zones 1904 and 1907 in which both the access zones and the relay zones are available. The first RS-group frame includes access zones 1909 and 1912 and two different relay zones, that is, first relay zones 1910 and 1913 and second relay zones 1911 and 1914. The second RS-group frame includes access zones 1916 and 1919 and two different relay zones, that is, first relay zones 1917 and 1920 and second relay zones 1918 and 1921.

Figure 20:
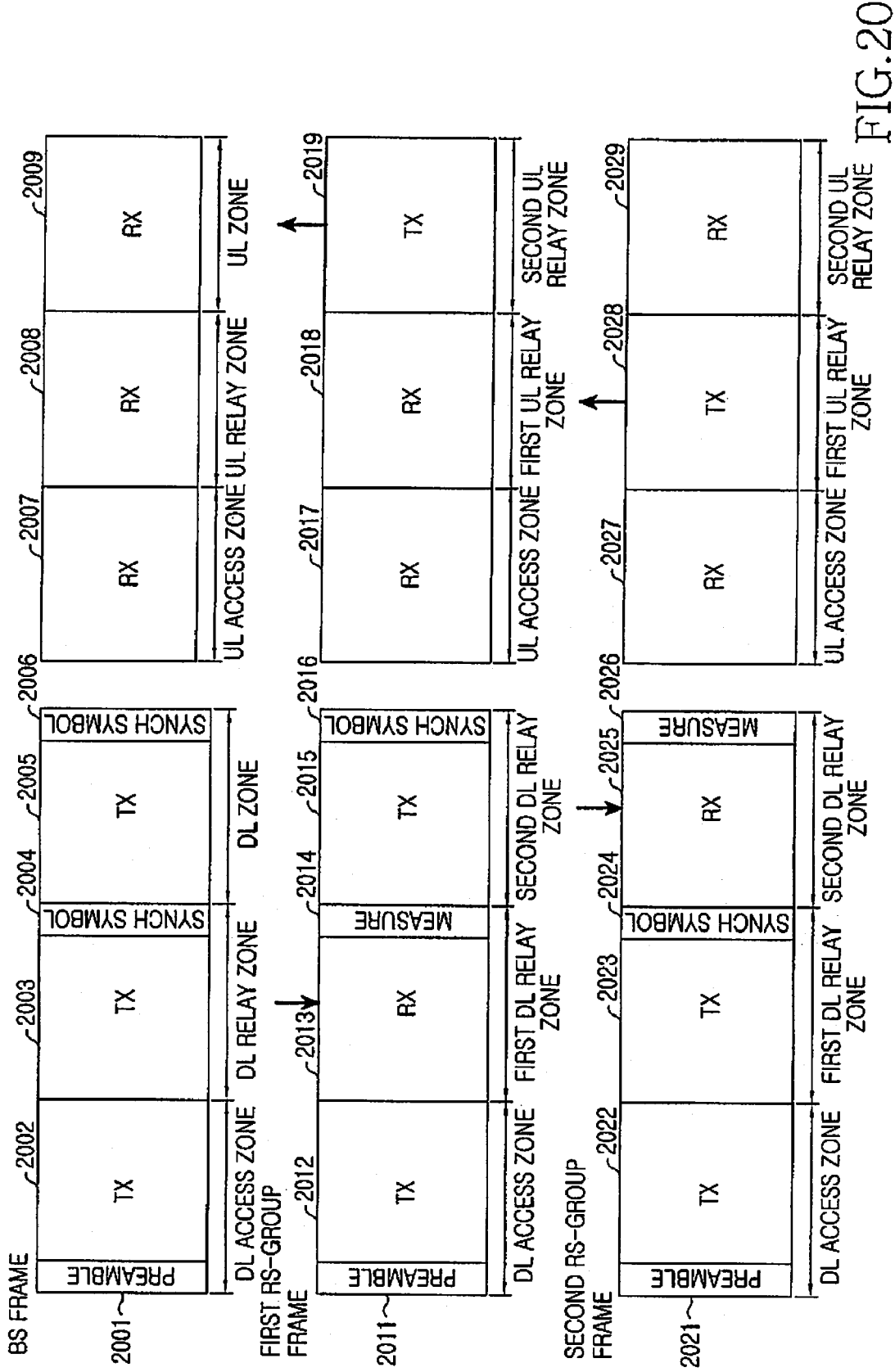
FIG. 20 illustrates a method in which an MS measures signal strengths of BSs and RSs transmitting interference signals, and RSs belonging to first and second RS-groups measure signal strengths of the BSs transmitting interference signals and signal strengths of RSs belonging to another group in a multi-hop relay BWA communication system according to the present invention.

FIG. 20 illustrates a method in which an MS measures signal strengths of BSs and RSs transmitting interference signals, and RSs belonging to first and second RS-groups measure signal strengths of the BSs transmitting interference signals and signal strengths of RSs belonging to another group in a multi-hop relay BWA communication system according to the present invention.

Referring to FIG. 20, the MS measures signal strengths of preambles 2001, 2011, and 2021 or synch symbols that are transmitted in DL access zones 2002, 2012, and 2022 of the BSs and the RSs, and reports the measurement result to the BSs and the RSs. In this case, the RSs re-report to the BSs the signal strengths reported from the MS.

Next, an RS belonging to the first RS-group measures (during a period indicated by 2014) a strength of a synch symbol 2004 or 2024 or a signature signal transmitted in a DL relay zone 2003 or 2023 of the BSs or the second RS-group, and reports the measurement result to the BSs.

An RS belonging to the second RS-group measures (during a period indicated by 2026) a strength of a synch symbol 2006 or 2016 or a signature signal transmitted in a DL relay zone 2005 or 2015 of the BSs or the first RS-group.

Only a DL frame scenario has been described above as an example. Although not shown, the same will also be applied to a UL frame scenario to measure strengths of interference signals.

Figure 21:
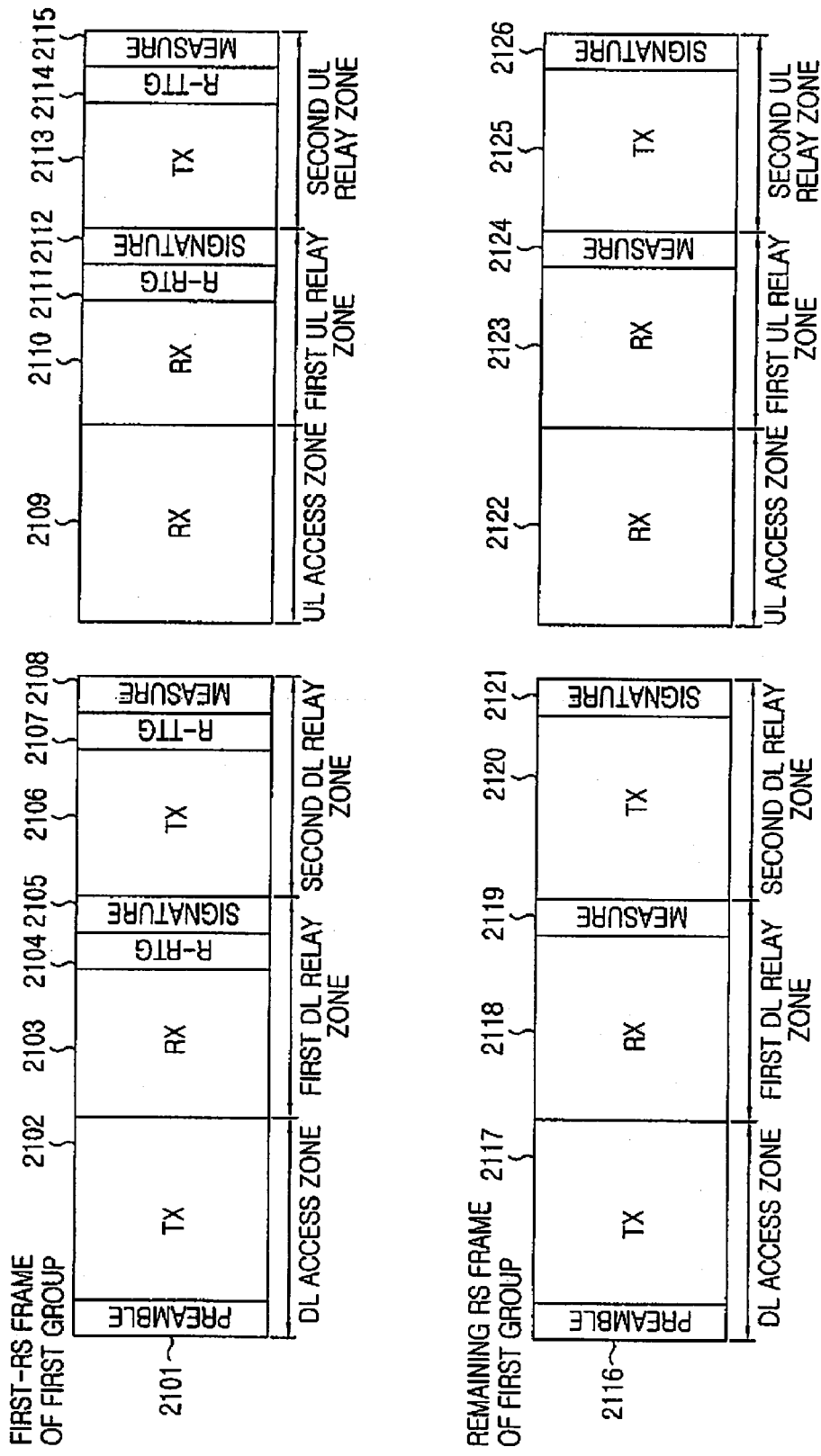
FIG. 21 illustrates a method in which, in a first relay zone, a plurality of RSs belonging to a first RS-group measure a signal strength of a first RS belonging to the same group and transmitting an interference signal, and in a second relay zone, the first RS measures signal strengths of the plurality of RSs transmitting interference signals in a multi-hop relay BWA communication system according to the present invention.

FIG. 21 illustrates a method in which, in a first relay zone, a plurality of RSs belonging to a first RS-group measure a signal strength of a first RS belonging to the same group and transmitting an interference signal, and in a second relay zone, the first RS measures signal strengths of the plurality of RSs transmitting interference signals in a multi-hop relay BWA communication system according to the present invention.

Referring to FIG. 21, among all RSs belonging to the first RS-group, the first RS transmits the interference signal in first relay zones 2103 and 2110 and also transmits a signature signal 2105 or 2112, a pilot signal, or a synch signal, each of which is used for identification to measure the interference signal, in the first DL relay zone 2103 or the first UL relay zone 2110. A plurality of remaining RSs other than the first RS measure (during a period indicated by 2119 or 2124) of interferences signals by using the signature signal, the pilot signal, or the synch signal, and then report the measurement result to a BS. R-RTGs 2104 and 2111 are inserted in front of the signature signals 2105 and 2112 in the first DL relay zone 2103 and the first UL relay zone 2110 of the first RS.

Next, among all RSs belonging to the first RS-group, the remaining RSs transmit interference signals in second relay zones 2120 and 2125 and also transmit a signature signal 2121 or 2126a pilot signal, or a synch signal, each of which is used for identification to measure the interference signals, in the second DL relay zone 2120 or the second UL relay zone 2125. The first RS measures (during a period indicated by 2108 or 2115) a strength of an interference signal by using the signature signal, the pilot signal, or the synch signal, and then reports the measurement result to the BS. R-TTGs 2107 and 2114 are inserted in front of the signal strength measurement periods 2108 and 2115 in a second DL relay zone 2106 and a second UL relay zone 2113 of the first RS.

Figure 22:
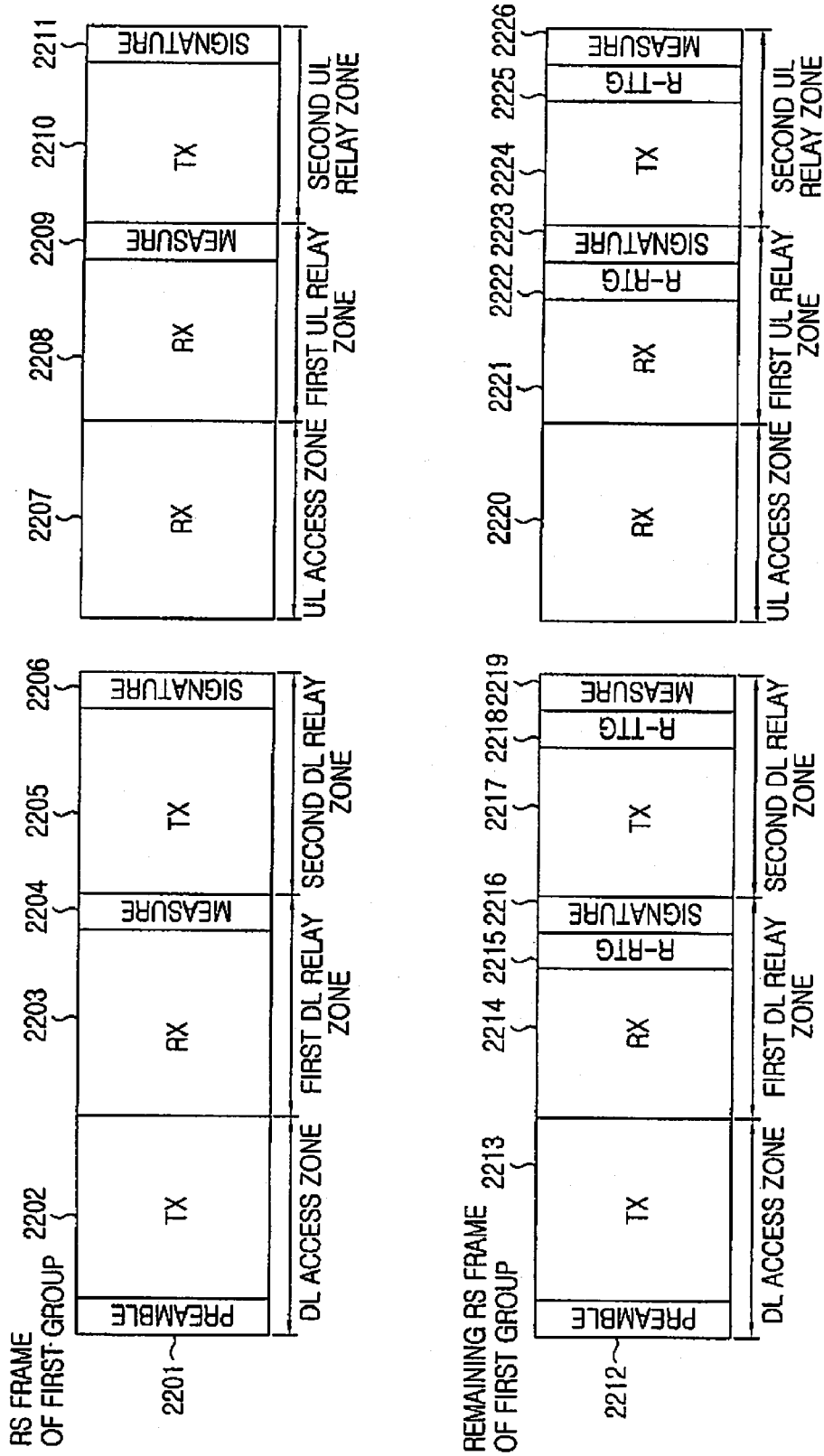
FIG. 22 illustrates a method in which, in a first relay zone, a first RS belonging to a first RS-group measures signal strengths of a plurality of remaining RSs belonging to the same group and transmitting interference signals, and in a second relay zone, the remaining RSs measure a signal strength of the first RS transmitting an interference signal in a multi-hop relay BWA communication system according to the present invention.

FIG. 22 illustrates a method in which, in a first relay zone, a first RS belonging to a first RS-group measures signal strengths of a plurality of remaining RSs belonging to the same group and transmitting interference signals, and in a second relay zone, the remaining RSs measure a signal strength of the first RS transmitting an interference signal in a multi-hop relay BWA communication system according to the present invention.

Referring to FIG. 22, among all RSs belonging to the first RS-group, the remaining RSs transmit interference signals in first relay zones 2214 and 2221 and also transmit a signature signal 2216 or 2223a pilot signal, or a synch signal, each of which is used for identification to measure the interference signals, in the first DL relay zone 2214 or the first UL relay zone 2221. The first RS measures (during a period indicated by 2204 or 2209) strengths of the interference signals by using the signature signal, the pilot signal, or the synch signal, and the reports measurement result to a BS. R-RTGs 2215 and 2222 are inserted in front of the signature signals 2216 and 2223 in the first DL relay zone 2214 and the first UL relay zone 2221 of the remaining RSs.

Next, among all RSs belonging to the first RS-group, the first RS transmits an interference signal in second relay zones 2205 and 2210 and also transmits a signature signal 2206 or 2211a pilot signal, or a synch signal, each of which is used for identification to measure the interference signal, in the second DL relay zone 2205 or the second UL relay zone 2210. The RSs measure (during a period indicated by 2219 or 2226) strengths of the interference signals by using the signature signal, the pilot signal, or the synch signal, and then report the measurement result to the BS. R-TTGs 2218 and 2225 are inserted in front of the signal strength measurement periods 2219 and 2226 in the second DL relay zone 2217 and the second UL relay zone 2224 of the remaining RSs.

Figure 23:
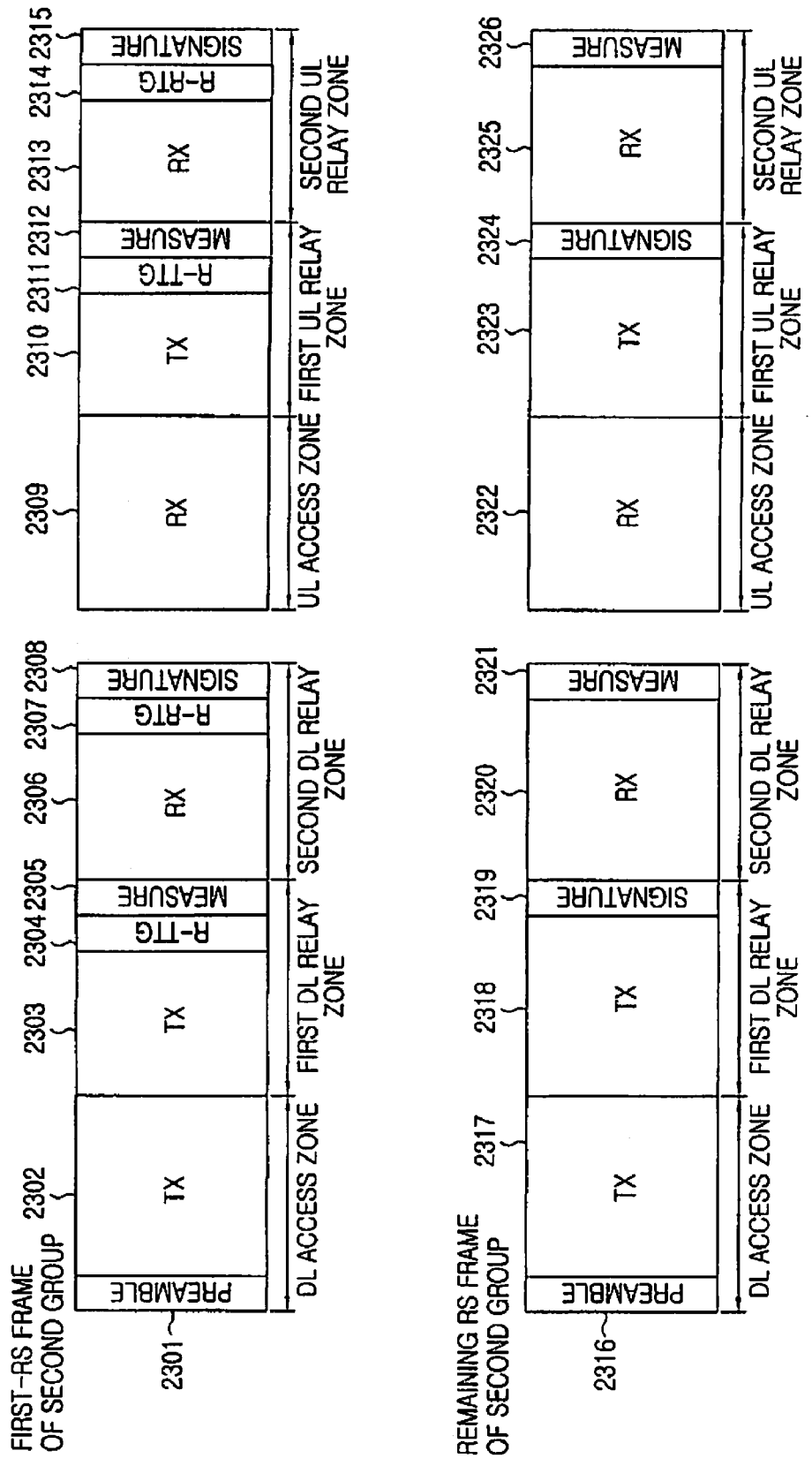
FIG. 23 illustrates a method in which, in a first relay zone, a first RS belonging to a second RS-group measures signal strengths of a plurality of remaining RSs belonging to the same group and transmitting interference signals, and in a second relay zone, the remaining RSs measure a signal strength of the first RS transmitting an interference signal in a multi-hop relay BWA communication system according to the present invention.

FIG. 23 illustrates a method in which, in a first relay zone, a first RS belonging to a second RS-group measures signal strengths of a plurality of remaining RSs belonging to the same group and transmitting interference signals, and in a second relay zone, the remaining RSs measure a signal strength of the first RS transmitting an interference signal in a multi-hop relay BWA communication system according to the present invention.

Referring to FIG. 23, among all RSs belonging to the second RS-group, the remaining RSs other than the first RS transmit interference signals in First relay zones 2318 and 2323 and also transmit a signature signal 2319 or 2324a pilot signal, or a synch signal, each of which is used for identification to measure the interference signals, in the first DL relay zone 2318 or the first UL relay zone 2323. The first RS measures strengths of the interference signals (during a period indicated by 2305 or 2312) by using the signature signal, the pilot signal, or the synch signal, and then reports the measurement result to a BS. R-TTGs 2304 and 2311 are inserted in front of the signal strength measurement periods 2305 and 2312 in the first DL relay zone 2303 and the first UL relay zone 2310 of the first RS.

Next, among all RSs belonging to the second RS-group, the first RS transmits an interference signal in second relay zones 2306 and 2313 and also transmits a signature signal 2308 or 2315a pilot signal, or a synch signal, each of which is used for identification to measure the signal strength, in the second DL relay zone 2306 or the second UL relay zone 2313. The remaining RSs measure (during a period indicated by 2321 or 2326) a strength of the interference signal by using the signature signal, the pilot signal, or the synch signal, and then report the measurement result to the BS. R-TTGs 2307 and 2314 are inserted in front of the signature signal periods 2308 and 2315 in the second DL relay zone 2306 and the second UL relay zone 2313 of the first RS.

Figure 24:
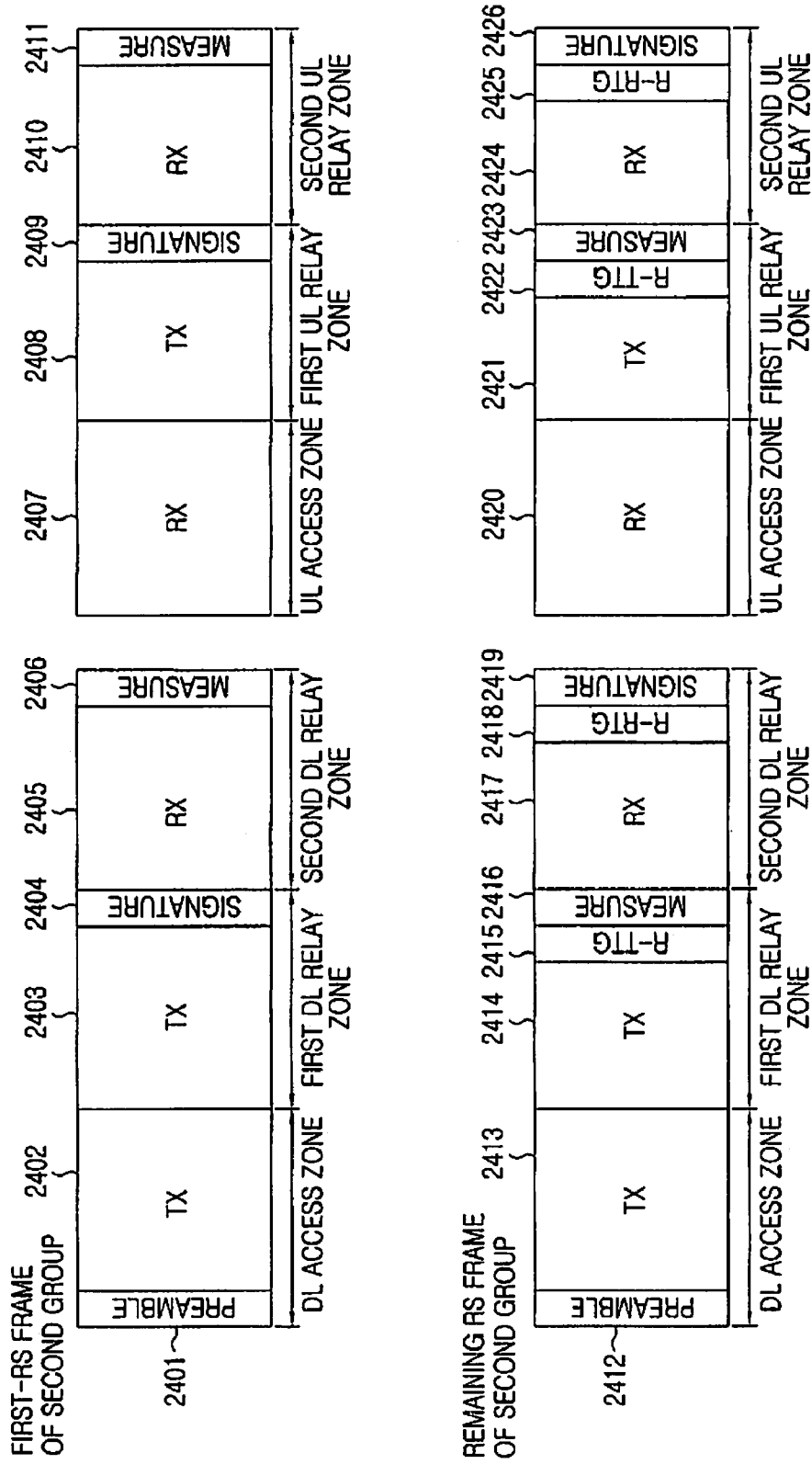
FIG. 24 illustrates a method in which, in a first relay zone, a plurality of RSs belonging to a second RS-group measure a signal strength of a first RS belonging to the same group and transmitting an interference signal, and in a second relay zone, the first RS measures signal strengths of the plurality of RSs transmitting interference signals in a multi-hop relay BWA communication system according to the present invention.

FIG. 24 illustrates a method in which, in a first relay zone, a plurality of RSs belonging to a second RS-group measure a signal strength of a first RS belonging to the same group and transmitting an interference signal, and in a second relay zone, the first RS measures signal strengths of the plurality of RSs transmitting interference signals in a multi-hop relay BWA communication system according to the present invention.

Referring to FIG. 24, among all RSs belonging to the second RS-Group, the first RS transmits a signature signal 1404 or 2409, a pilot signal, or a synch signal, each of which is used for identification to measure the interference signal, in the first DL relay zone 2403 or the first UL relay zone 2408. A plurality of remaining RSs other than the first RS measure (during a period indicated by 2416 or 2423) the strength of the interference signal by using the signature signal, the pilot signal, or the synch signal, and then report the measurement result to a BS. R-TTGs 2415 and 2422 are inserted in front of the signal strength measurement periods 2416 and 2423 in a first DL relay zone 2414 and a first UL relay zone 2421 of the plurality of RSs Next, among all RSs belonging to the second RS-group, the plurality of RSs transmit the interference signals in second relay zones 2417 and 2424 and also transmit a signature signal 2419 or 2426 a pilot signal, or a synch signal, each of which is used for identification to measure the interference signals, in the second DL relay zone 2417 or the second UL relay zone 2424. The first RS measures (indicated by 2406 or 2411) strengths of the interference signals by using the signature signal, the pilot signal, or the synch signal, and then reports the measurement result to the BS. R-RTGs 2418 and 2425 are inserted in front of the signature signal periods 2419 and 2426 in the second DL relay zone 2417 and the second DL relay zone 2424 of the plurality of RSs.

In the present invention, a signature is defined in association with the second or third relay zone and is transmitted by BSs or RSs. When a permutation value of a preamble defined in the first period is reused, the signature is in accordance with an index of the permutation value of the preamble, a cell ID (IDcell), and segment information. When the signature uses a newly defined permutation value, the signature may be in accordance with an index of a permutation value of the signature, a cell ID, and segment information. That is, the permutation index, the cell ID, and the segment information of the signature may be the same as those of the preamble, or may be newly defined for each BS or RS.

Furthermore, in the present invention, R-TTG is a period in which an RS switches from transmission to reception mode, and R-RTG is a period in which the RS switches from reception to transmission mode. Both the R-TTG and the R-RTG are defined in the second or third relay zone. The BS or the RS may transmit or receive a control signal so that a signature signal defined in the relay zone can be transmitted or received.

According to the present invention, an apparatus and method are provided in which an MS or an RS measures signals from neighboring BSs and neighboring RSs, and when the RS transmits the measurement result to a BS as interference signal information, the BS computes a resource allocation to be used by the RS by using the interference signal information. Therefore, there is an advantage in that wireless resources can be reused to the maximum extent. In addition, data transmission efficiency can be maximized. It is to be understood that the structures disclosed in the present invention can be enabled by and recorded on a computer-readable medium. For example, the structure of a DL frame of a BS herein can be enabled by and recorded on a computer-readable medium.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:
1. A method of receiving scanning information from a Relay Station (RS) by an entity having a right to control the RS in a Broadband Wireless Access (BWA) communication system, the method comprising:

receiving a message for requesting scanning period allocation from the RS or determining, by the entity, that the RS needs to perform scanning;

allocating a scanning period to the RS;

transmitting a message including at least one of the allocated scanning period and information on neighboring Base Stations (BSs) and neighboring RSs to be scanned by the RS; and receiving, from the RS, scanning information of the neighboring BSs and the neighboring RSs.

2. The method of claim 1, further comprising, prior to the receiving of the scanning information, performing a network entry process with the RS and an RS registration process.

3. The method of claim 1, wherein the information on the neighboring BSs and the neighboring RSs to be scanned by the RS is information on a scanning group including the neighboring BSs and the neighboring RSs.

4. The method of claim 3, wherein the scanning group is classified by using at least one of a distance from the RS, a mobility, and a signal strength, and classified scanning groups have a different scanning period from each other.

5. The method of claim 1, wherein the scanning information includes at least one of signal strength values of the neighboring BSs and the neighboring RSs and amble indices of the neighboring BSs and the neighboring RSs or the IDentifications (IDs) of the neighboring RSs and neighboring BSs.

6. The method of claim 5, wherein the signal strength value is a Received Signal Strength Indicator (RSSI) or Carrier to Interference and Noise Ratio (CINR) value that satisfies a threshold.

7. The method of claim 1, further comprising:

computing a resource allocation to be used by the RS by using the received scanning information; and transmitting information on the computed resource allocation to the RS.

8. The method of claim 7, wherein the information on the computed resource allocation is selected from a group comprising at least one of information which assigns one or more RSs having less interference to one resource reuse group, information which indicates a resource use priority for a physical frame in a time or frequency domain, information which indicates a time or frequency domain of a wireless resource that can be used by an RS, and an indication about a preamble or pilot channel used by an RS.

9. An apparatus for receiving scanning information from a Relay Station (RS) in a Broadband Wireless Access (BWA) communication system, the apparatus comprising:

the RS for scanning neighboring Base Stations (BSs) and neighboring RSs and for transmitting scanning information to a BS; and the BS for receiving, from the RS, the scanning information of the neighboring BSs and the neighboring RSs, wherein, when a message for requesting scanning period allocation is received from the RS or when the BS determines that the RS needs to perform scanning, the BS allocates a scanning period to the RS and transmits to the RS a message including at least one of the allocated scanning period and information on the neighboring BSs and the neighboring RSs to be scanned by the RS.

10. The apparatus of claim 9, wherein, after the scanning is performed and before the scanning information is transmitted, the RS performs a network entry process with the BS and an RS registration process.

11. The apparatus of claim 9, wherein the information on the neighboring BSs and the neighboring RSs to be scanned by the RS is information on a scanning group including the neighboring BSs and the neighboring RSs.

12. The apparatus of claim 11, wherein the scanning group is classified by using at least one of a distance from the RS, a mobility, and a signal strength, and classified scanning groups have a different scanning period from each other.

13. The apparatus of claim 9, wherein the scanning information includes at least one of signal strength values of the neighboring BSs and the neighboring RSs and amble indices of the neighboring BSs and the neighboring RSs or the IDentifications (IDs) of the neighboring RSs and neighboring BSs.

14. The apparatus of claim 13, wherein the signal strength value is a Received Signal Strength Indicator (RSSI) or Carrier to Interference and Noise Ratio (CINR) value that satisfies a threshold.

15. The apparatus of claim 9, wherein the BS computes a resource allocation to be used by the RS by using the scanning information and transmits information on the computed resource allocation to the RS.

16. The apparatus of claim 15, wherein the information on the computed resource allocation is selected from a group comprising at least one of information which assigns one or more RSs having less interference to one resource reuse group, information which indicates a resource use priority for a physical frame in a time or frequency domain, information which indicates a time or frequency domain of a wireless resource that can be used by an RS, and an indication about preamble or pilot channel used by an RS.

* * * * *